(12) United States Patent
Kikuchi

(10) Patent No.: US 8,705,514 B2
(45) Date of Patent: Apr. 22, 2014

(54) APPARATUS FOR CONTROLLING A TRANSFER DESTINATION OF A PACKET ORIGINATING FROM A VIRTUAL MACHINE

(75) Inventor: Shunsuke Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 13/313,182

(22) Filed: Dec. 7, 2011

(65) Prior Publication Data

US 2012/0147890 A1  Jun. 14, 2012

(30) Foreign Application Priority Data

Dec. 13, 2010 (JP) ................................ 2010-277400

(51) Int. Cl.
*G06F 9/00* (2006.01)

(52) U.S. Cl.
USPC ........................................................ 370/351

(58) Field of Classification Search
USPC ......................................... 370/392, 389, 351
See application file for complete search history.

(56) References Cited

U.S. PATENT DOCUMENTS

| 2006/0168336 | A1 | 7/2006 | Koyanagi et al. |
| 2008/0123622 | A1 | 5/2008 | Kaganoi et al. |
| 2012/0216273 | A1* | 8/2012 | Rolette et al. .................. 726/13 |

FOREIGN PATENT DOCUMENTS

| JP | 2002-198989 | 7/2002 |
| JP | 2005-012672 | 1/2005 |
| JP | 2007-036813 | 2/2007 |
| JP | 2008-136049 | 6/2008 |

\* cited by examiner

*Primary Examiner* — Raj Jain
*Assistant Examiner* — Zhiren Qin
(74) *Attorney, Agent, or Firm* — Fujitsu Patent Center

(57) ABSTRACT

Transfer destination of a packet originating from a virtual machine is controlled so as to allow a capture device arranged in a communication network to capture a packet that is transferred using a communication tunnel. A first server acquires a first packet originating from a source virtual machine being operated by the first server, encapsulates the first packet by adding source and destination addresses. The first server further adds a transfer-destination address to the encapsulated first packet to generate a second packet when the first packet is determined to be a target packet to be captured by the capture device. Then, the first server transmits the second packet including the transfer-destination address to the second server using the communication tunnel while the second packet including the first packet is transferred to the transfer-destination address.

11 Claims, 26 Drawing Sheets

FIG. 3

| DESTINATION VM-ADDRESS | FORWARDING-DESTINATION ID |
|---|---|
| B | ID IDENTIFYING ENCAPSULATOR-a |
| D | ID IDENTIFYING ENCAPSULATOR-b |
| C | ID IDENTIDYING ENCAPSULATOR-c |
| ... | ... |

FIG. 4

| VIRTUAL MACHINE ID | TRANSFER-DESTINATION ADDRESS |
|---|---|
| VM-A1 | Address-X |
| VM-A2 | |

FIG. 5

| DESTINATION ADDRESS | FORWARDING-DESTINATION ID |
|---|---|
| Address-B | ID IDENTIFYING OUTSIDE PACKET HANDLER |
| Address-D | ID IDENTIFYING OUTSIDE PACKET HANDLER |
| Address-A | ID IDENTIFYING ENCAPSULATOR-a |
| Address-E | ID IDENTIFYING ENCAPSULATOR-b |
| ... | ... |

FIG. 8

| VIRTUAL MACHINE ID | TRANSFER-DESTINATION ADDRESS |
|---|---|
| VM-A1 | Address-X |

FIG. 10

| SYSTEM ID | VIRTUAL MACHINE ID |
|---|---|
| System1 | VM-A1 |
| | VM-B1 |
| | VM-C1 |
| System2 | VM-A2 |
| | VM-C2 |
| | VM-D1 |

FIG. 11

| CAPTURE-DEVICE ID | CAPTURE-DEVICE ADDRESS |
|---|---|
| Cap1 | Address-X |

FIG. 15

| VIRTUAL MACHINE ID | SOURCE TUNNEL ADDRESS | DESTINATION TUNNEL ADDRESS | TRANSFER-DESTINATION ADDRESS |
|---|---|---|---|
| VM-A1 | Address-A<br>Address-C | Address-B<br>Address-D | Address-X<br>Address-X |
| VM-A2 | Address-E<br>Address-G | Address-F<br>Address-H | |

FIG. 16

| VIRTUAL MACHINE ID | SOURCE TUNNEL ADDRESS | DESTINATION TUNNEL ADDRESS | TRANSFER-DESTINATION ADDRESS |
|---|---|---|---|
| VM-A1 | Address-A | Address-B | Address-X |

FIG. 17

| SYSTEM ID | VIRTUAL MACHINE ID | SOURCE TUNNEL ADDRESS | DESTINATION TUNNEL ADDRESS |
|---|---|---|---|
| System1 | VM-A1 | Address-A | Address-B |
|  |  | Address-C | Address-D |
|  | VM-B1 | Address-B | Address-A |
|  |  | Address-I | Address-J |
|  | VM-C1 | Address-D | Address-C |
|  |  | Address-J | Address-I |
| System2 | VM-A2 | Address-E | Address-F |
|  |  | Address-G | Address-H |
|  | VM-C2 | Address-F | Address-E |
|  |  | Address-K | Address-L |
|  | VM-D1 | Address-H | Address-G |
|  |  | Address-L | Address-K |

FIG. 19

| VIRTUAL MACHINE ID | TRANSFER-DESTINATION ADDRESS |
|---|---|
| VM-A1 | Address-M, Address-X |
| VM-A2 | |

FIG. 22

| CAPTURE DEVICE ID | CAPTURE-DEVICE ADDRESS |
|---|---|
| Cap1 | Address-X |
| Cap2 | Address-Y |
| Cap3 | Address-Z |

FIG. 24

| CAPTURE-DEVICE ID | NETWORK LOAD | CAPTURE-DEVICE ADDRESS |
|---|---|---|
| Cap1 | 200000 | Address-X |
| Cap2 | 400000 | Address-Y |
| Cap3 | 500000 | Address-Z |

FIG. 27

| CAPTURE-DEVICE ID | AVAILABLE STORAGE AREA SIZE | CPU LOAD | CAPTURE-DEVICE ADDRESS |
|---|---|---|---|
| Cap1 | 500GB | 70% | Address-X |
| Cap2 | 300GB | 50% | Address-Y |
| Cap3 | 100GB | 30% | Address-Z |

APPARATUS FOR CONTROLLING A TRANSFER DESTINATION OF A PACKET ORIGINATING FROM A VIRTUAL MACHINE

CROSS-REFERENCE TO RELATED APPLICATION

This application is based upon and claims the benefit of priority of the prior Japanese Patent Application No. 2010-277400, filed on Dec. 13, 2010, the entire contents of which are incorporated herein by reference.

FIELD

The present invention relates to an apparatus for controlling a transfer destination of a packet originating from a virtual machine.

BACKGROUND

In recent years, virtualization techniques that enable virtual machines to communicate with each other have been used in a data center accommodating a plurality of customer systems so that the plurality of customer systems are separated from each other within the data center. The virtualization techniques include a L2 (Layer 2) tunneling method that allows a pair of virtual machines to be communicably coupled with each other via virtual communication lines.

In a data center, for example, a plurality of virtual machines arranged within the same customer system are communicably coupled with each other using a L2 tunneling method. In the case, actual transmission routes through which packets are exchanged among the plurality of virtual machines are determined based on a setting status of virtual communication lines that are established within the customer system so as to communicably couple any pair of virtual machines using the L2 tunneling method.

In a communication system where a plurality of virtual machines communicate with each other using a L2 tunneling method as mentioned above, it is sometimes required to capture intended packets from all the packets being transmitted among the plurality of virtual machines, for the purpose of analyzing the operational states of the plurality of virtual machines, for example, when a failure has occurred in the communication system. As a method for capturing intended packets that are flowing in a communication network, for example, a capture device may be installed at an arbitrary point along a transmission route in the communication network so as to capture the intended packet from all the packets being transmitted in the communication network.

However, the above mentioned method has a problem that intended packets may not be captured efficiently. That is, when the arrangement of the plurality of virtual machines are changed and thereby the currently-used communication routes are also changed, a plurality of capture devices need to be installed along all the relevant transmission routes before and after changing the arrangement of the plurality of virtual machines.

SUMMARY

According to an aspect of an embodiment, there is provided an apparatus for controlling a transfer destination of a packet originating from a virtual machine so as to allow a capture device arranged in a communication network to capture a packet that is transferred using a communication tunnel coupling a source virtual machine being operated by the apparatus and a destination virtual machine being operated by another apparatus. The apparatus acquires a first packet originating from the source virtual machine being operated by the apparatus, and encapsulates the acquired first packet by adding source and destination tunnel addresses used for the communication tunnel to the acquired first packet, where the source tunnel address indicates an address assigned to the apparatus operating the source virtual machine and the destination tunnel address indicates an address assigned to the another apparatus operating the destination virtual machine. The apparatus further adds the first transfer-destination address to the encapsulated first packet to generate a second packet when the first packet is determined to be a target packet to be captured by the capture device, and transmits the second packet including the first transfer-destination address to the another apparatus operating the destination virtual machine using the communication tunnel, while the second packet including the first packet is transferred to the first transfer-destination address.

According to another aspect of an embodiment, there is provided an apparatus for controlling a transfer destination of a packet originating from a virtual machine so as to allow a capture device arranged in a communication network to capture a packet that is transferred using a communication tunnel coupling source and destination virtual machines belonging to one of one or more systems. The apparatus acquires one or more target virtual machine identifiers each identifying a virtual machine belonging to a target system, where the target system is selected, from the one or more systems, as a system undergoing capture processing in which a packet originating from any one of virtual machines belonging to the system is captured by the capture device. The apparatus generates, for each of the acquired one or more target virtual machine identifiers, a transfer-destination setting message that stores a transfer-destination address in association with the each of the acquired one or more target virtual machine identifiers, where the transfer-destination address indicates an address to which a target packet to be captured by the capture device is transferred. The apparatus transmits, to a server operating a target virtual machine identified by the each of the acquired one or more target virtual machine identifiers, the generated transfer-destination setting message so that the server encapsulates the target packet by adding the transfer-destination address extracted from the received transfer-destination setting message, and transmits the encapsulated target packet including the transfer-destination address to another server operating the destination virtual machine using the communication tunnel while the encapsulated target packet is transferred to the transfer-destination address.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 3 is a diagram illustrating an example of a first forwarding table, according to an embodiment;

FIG. 4 is a diagram illustrating an example of a transfer destination table, according to an embodiment;

FIG. 5 is a diagram illustrating an example of a second forwarding table, according to an embodiment;

FIG. 8 is a schematic diagram illustrating an example of parameters that are set to a transfer-destination setting message, according to an embodiment;

FIG. 10 is a diagram illustrating an example of a tunnel management table, according to an embodiment;

FIG. 11 is a diagram illustrating an example of a capture-device management table, according to an embodiment;

FIG. 15 is a diagram illustrating an example of a transfer destination table, according to a second embodiment;

FIG. 16 is a diagram illustrating an example of parameters that are set to a transfer-destination setting message, according to a second embodiment;

FIG. 17 is a diagram illustrating an example of a tunnel management table, according to a second embodiment;

FIG. 19 is a diagram illustrating an example of a transfer destination table, according to a third embodiment;

FIG. 22 is a diagram illustrating an example of a capture-device management table, according to a fourth embodiment;

FIG. 24 is a diagram illustrating an example of a capture-device management table, according to a fifth embodiment;

FIG. 27 is a diagram illustrating an example of a capture-device management table, according to a sixth embodiment;

DESCRIPTION OF EMBODIMENTS

The following will describe details of embodiments. However, the present invention is not limited to these embodiments.

A First Embodiment

A first embodiment will be described below in the following order: a configuration of a virtual network system, a configuration of a server, a configuration of a management device, an operational flowchart of a server, and an operational flowchart of a management device. First, a configuration of a virtual network system will be described with reference to FIG. 1.

Figure 1:
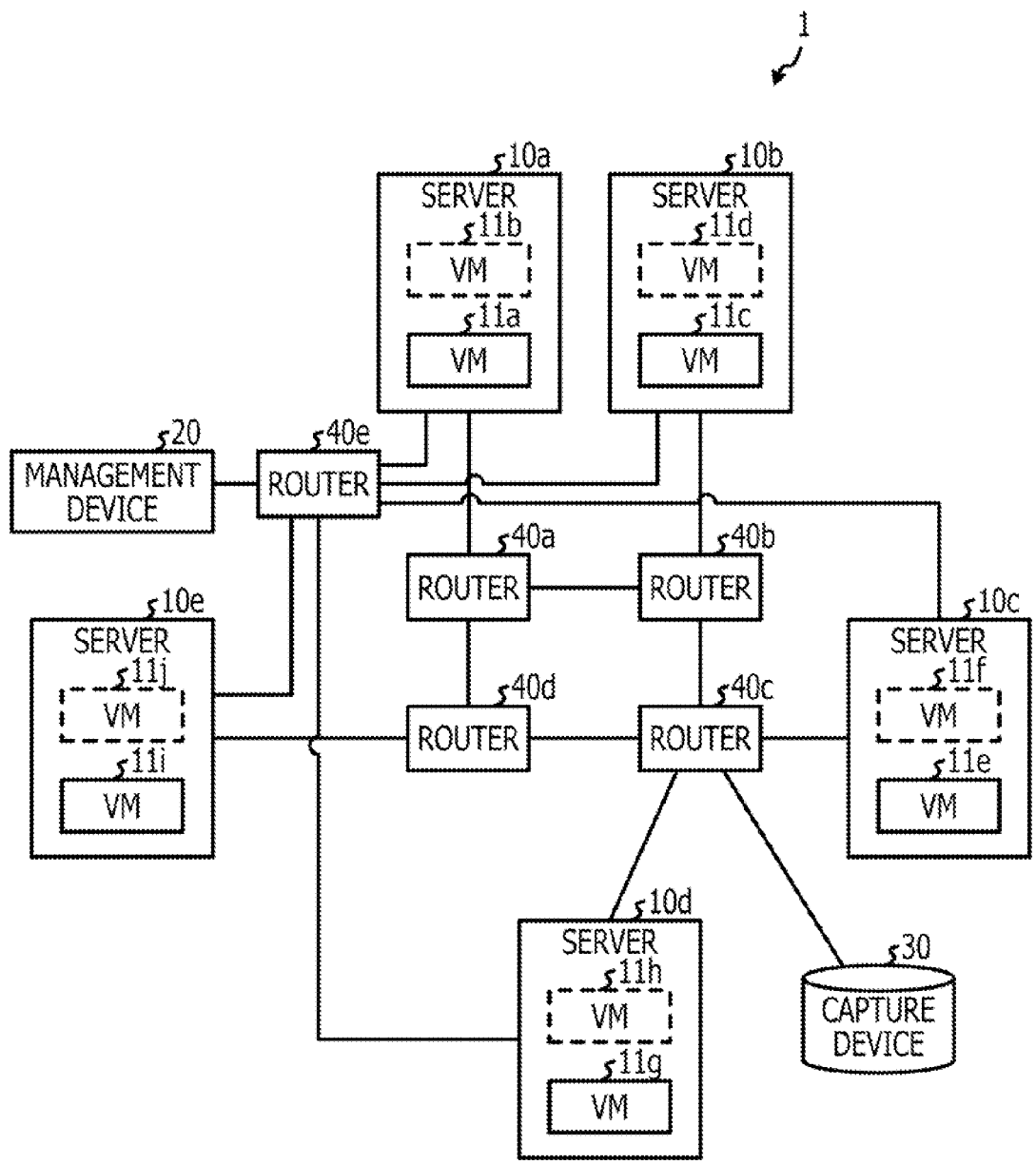
FIG. 1 is a diagram illustrating a configuration example of a virtual network system, according to a first embodiment.

FIG. 1 is a diagram illustrating a configuration example of a virtual network system, according to a first embodiment. As depicted in FIG. 1, virtual network system 1 may be configured to include, for example, a plurality of servers 10a to 10e, a management device 20, a capture device 30, and a plurality of routers 40a to 40e. Further, each of the plurality of servers 10a to 10e may be configured to operate one or more virtual machines. For example, server 10a operates virtual machines (VMs) 11a and 11b, server 10b operates virtual machines (VMs) 11c and 11d, server 10c operates virtual machines (VMs) 11e and 11f, server 10d operates virtual machines (VMs) 11g and 11h, and sever 10e operates virtual machines (VMs) 11i and 11j. Hereinafter, a virtual machine (virtual machines) will also be expressed as a VM (VMs).

Virtual network system 1 according to a first embodiment may be configured as a network that is constructed within a data center accommodating a plurality of customer systems. In the case, for example, a Layer 2 (L2) tunneling method may be employed as a communication method for coupling each pair of virtual machines within the same costumer system so that the plurality of customer systems are separated from each other. Here, a Layer 2 (L2) tunneling method is a technique that virtually establishes a directly-connected communication line that exclusively connects any pair of virtual machines in a communication network. Here, a communication method for connecting a pair of virtual machines is not limited to a L2 tunneling method.

In the example of FIG. 1, out of VMs 11a to 11j that are operated by servers 10a to 10e, VMs 11a, 11c, 11e, 11g, and 11i, which are depicted by solid lines, are virtual machines constituting one customer system. In virtual network system according to the first embodiment, it is assumed that packets transmitted from VMs 11a, 11c, 11e, 11g, and 11i become target packets that are to be captured by a capture device.

Further, VMs 11b, 11d, 11f, 11h, and 11j, which are depicted by dashed lines, are virtual machines constituting the other customer system. In the case, it is assumed that packets originating from VMs 11b, 11d, 11f, 11h, 11j are not target packets that are to be captured by a capture device. As illustrated in FIG. 1, VMs 11a, 11c, 11e, 11g, and 11i are all connected to each other using a L2 tunneling method that allows a pair of virtual machines to be communicably coupled with each other via a virtual communication line.

Each of VMs 11a to 11j includes a virtual memory and a virtual processor (not depicted in FIG. 1). A virtual memory is a virtualized memory that is implemented by allocating a predetermined area within a memory area of each of servers 10a to 10e, to a virtual machine, so as to be used as a memory by the virtual machine. A virtual processor is a virtualized processor that is implemented by allocating a predetermined processing capacity within a processing capacity of each of servers 10a to 10e, to a virtual machine, so as to be used as a processor by the virtual machine.

Management device 20 is coupled to servers 10a to 10e via router 40e. Management device 20 transmits a transfer-destination setting message to each of servers 10a to 10e so that the each of servers 10a to 10e sets a virtual machine identifier identifying a target virtual machine on which capture processing is to be performed, in association with a transfer-destination address that indicates an address of an available capture device used for capturing the target packet or an address of a mirroring router that transfer a copy of the target packet to the capture device.

Capture device 30 is coupled to router 40c. Capture device 30 receives a target packet that has been transmitted from router 40c, and stores the received target packet in a memory thereof. Here, when mirroring processing is being set to router 40c, router 40c transfers the received packet to capture device 30. In this case, upon receiving the packet having an address of router 40c as a transfer-destination address, router 40c transfers a copy of the received packet to capture device 30. At the same time, router 40c deletes from the received packet the address of router 40c that is being set as a transfer-destination address, and transfers the packet to another transfer-destination address when there exists a transfer-destination address left in the packet, and otherwise to a destination address of the packet. Meanwhile, upon receiving a packet having an address of capture device 30 as a transfer-destination address, router 40c transfers the received packet to capture device 30 so as to provide capture device 30 with the received packet.

Each of routers 40a to 40d receives a packet, and forwards the received packet based on an destination address set to the received packet. In the example of FIG. 1, router 40a is coupled to server 10a and other routers 40b and 40d. Router 40b is coupled to server 10b and other routers 40a and 40c. Router 40c is coupled to servers 10c and 10d, capture device 30, and other routers 40b and 40d. Router 40d is coupled to other routers 40a and 40c. Router 40e is coupled to servers 10a to 10e, and management device 20. Next, a configuration of server 10a depicted in FIG. 1 will be described with reference to FIG. 2.

Figure 2:
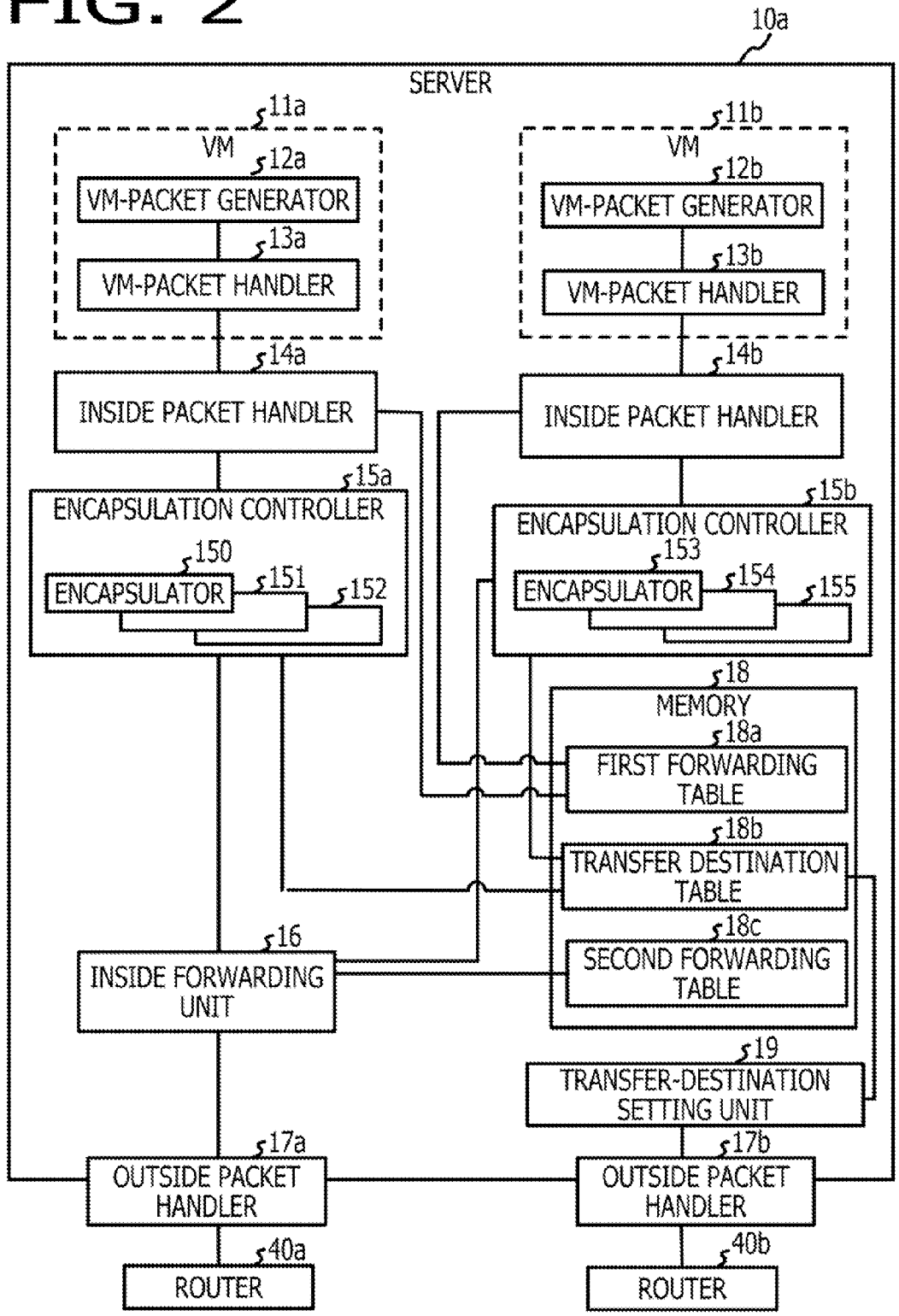
FIG. 2 is a diagram illustrating a configuration example of a server, according to a first embodiment.

FIG. 2 is a diagram illustrating a configuration example of a server, according to a first embodiment. As depicted in FIG. 2, for example, server 10a may be configured to include VMs 11a and 11b, VM-packet generators 12a and 12b, VM-packet handlers 13a and 13b, inside packet handlers 14a and 14b, encapsulation controllers 15a and 15b, inside forwarding unit 16, outside packet handlers 17a and 17b, memory 18, and transfer-destination setting unit 19. A configuration of server 10a in virtual network system 1 as depicted in FIG. 1 will be described below as an exemplary configuration of a server. Each of servers 10b to 10e may also be configured in a manner similar to server 10a.

Memory 18 is a memory for storing data and programs that are needed for various pieces of processing. For example, memory 18 may be configured to store first forwarding table 18a, transfer destination table 18b, and second forwarding table 18c, as depicted in FIG. 2. Here, memory 18 may be implemented either using a semiconductor memory chip such as a RAM (Random Access Memory), a ROM (Read Only Memory), and a flash memory, or using a storage device such as a hard disk and an optical disk.

First forwarding table 18a may be configured as a table that stores a destination virtual machine address of a VM-packet generated by VM 11a, in association with a forwarding destination identifier identifying a forwarding destination of the packet within server 10a. Hereinafter, a packet generated by a virtual machine is expressed as "a VM-packet", and a virtual machine address is also expressed as "a VM-address". Next, description will be given of first forwarding table 18a with reference to FIG. 3.

FIG. 3 is a diagram illustrating an example of a first forwarding table, according to an embodiment. As depicted in FIG. 3, first forwarding table 18a stores a destination VM-address of a packet generated by VM 11a in association with a forwarding destination identifier identifying a component to which the VM-packet is to be forwarded within server 10a. In the following figures, word "identifier" will be also expressed as "ID".

For example, referring to FIG. 3, first forwarding destination table 18a stores a destination VM-address "B" in association with an identifier identifying "encapsulator-a" to which the VM-packet is to be forwarded within server 10a. As will be described later, first forwarding destination table 18a is referred by inside packet handler 14a so that one of encapsulators 150 to 152 (corresponding to encapsulators-a, -b, and c, respectively) is selected as a forwarding destination to which the VM-packet is to be forwarded within server 10a.

Transfer destination table 18b is a table for storing a transfer-destination address that is added to a VM-packet generated by VMs 11a and 11b. Here, description will be given of transfer destination table 18b with reference to FIG. 4.

FIG. 4 is a diagram illustrating an example of a transfer destination table, according to an embodiment. As depicted in FIG. 4, transfer destination table 18b stores a transfer-destination address in association with a virtual machine identifier identifying one of virtual machines being operated by server 10a. Here, the transfer-destination address is added to a VM-packet when the VM-packet is determined to be a target packet to be captured by a capture device, For example, referring to FIG. 4, transfer destination table 18b stores transfer-destination address "Address-X" in association with virtual machine identifier "VM-A1". This indicates that when encapsulating a VM-packet generated by virtual machine 11a having virtual machine identifier "VM-A1", a transfer-destination address "Address-X" (for example, an address of router 40c or an address of capture device 30) should be added to the generated VM-packet. Further, in the example of FIG. 4, an entry of the transfer-destination address column that corresponds to virtual machine identifier "VM-A2" is blank. This means that a transfer-destination address is not added to a VM-packet generated by virtual machine 11b having virtual machine identifier "VM-A2" when the VM-packet is encapsulated.

Second forwarding table 18c is a table that stores a destination address of the encapsulated packet received by inside forwarding unit 16 in association with a forwarding destination of the encapsulated packet within server 10a. Here, description will be given of second forwarding table 18c with reference to FIG. 5.

FIG. 5 is a diagram illustrating an example of a second forwarding table, according to an embodiment. As depicted in FIG. 5, second forwarding table 18c stores a destination address of the encapsulated packet received by inside forwarding unit 16 in association with a forwarding destination to which the encapsulated packet is to be forwarded within server 10a. For example, referring to FIG. 5, second forwarding table 18c stores destination address "Address-B" of the encapsulated packet, in association with forwarding destination "outside packet handler" to which the encapsulated packet is to be forwarded within server 10a. Here, "outside packet handler" depicted in FIG. 5 indicates outside packet handler 17a of FIG. 2. As will be described later, second forwarding table 18c is referred by inside forwarding unit 16 so as to select, as a destination to which the encapsulated packet is to be forwarded, one of forwarding destinations: encapsulators 150 to 155, and outside packet handler 17a.

Further, as depicted in FIG. 2, server 10a is operating VMs 11a and 11b that belong to different customer systems, respectively. In the following examples, it is assumed that VM 11a is a target virtual machine on which capture processing is to be performed. That is, any VM-packet originating from VM 11a becomes a target packet to be captured by a capture device. VM 11a may be configured to include VM-packet generator 12a and VM-packet handler 13a, and may perform packet transmission between VM 11a and another virtual machine, for example, VM 11g belonging to the same customer system as VM 11a.

VM-packet generator 12a generates a VM-packet in which an address of a source virtual machine and an address of a destination virtual machine are being set. For example, VM-packet generator 12a executes a predetermined application within VM 11a to generate a VM-packet that is to be sent to VM 11g belonging to the same customer system as VM 11a. Thereafter, VM-packet generator 12a sends the generated VM-packet to VM-packet handler 13a. Here, source and destination virtual machine addresses are set to the VM-packet generated by VM-packet generator 12a.

VM-packet handler 13a may be configured as software that functions as a virtual NIC (Network Interface Card) operated by VM 11a. For example, VM-packet handler 13a sends a VM-packet generated by VM 11a, to inside packet handler 14a, and receives, from inside packet handler 14a, a VM-packet that has been sent from another virtual machine.

Inside packet handler 14a receives a VM-packet, in which a source virtual machine address and a destination virtual machine address are set, from VM 11a being operated by server 11a. For example, inside packet handler 14a receives, from VM-packet handler 13a of VM 11a, a VM-packet in which source virtual machine address A' and destination virtual machine address B' is being set, and forwards the received packet, within server 10a, to a component by which the received VM-packet is to be processed.

In the case, upon receiving a VM-packet, inside packet handler 14a extracts destination virtual machine address B' from the received VM-packet, and determines a forwarding destination of the received VM-packet within server 10a. Here, the forwarding destination indicates a component within server 10a by which the received packet is to be processed. Here, inside packet handler 14a determines a forwarding destination of the received packet by referring to first forwarding table 18a. In the example of FIG. 3, when a destination virtual machine address is B', inside packet handler 14a determines "encapsulator-a" to be the forwarding destination corresponding to destination virtual machine address B', where it is assumed that encapsulator-a indicates encapsulator 150 depicted in FIG. 2. Thereafter, inside packet-handler 14a forwards the received VM-packet to encapsulator 150 within server 10a.

Encapsulation controller 15a may be configured to include one or more encapsulators, for example, encapsulators 150 to 152. As a default setting, encapsulation controller 15a may set parameters needed for performing encapsulation processing, to each of encapsulators 150 to 152. For example, encapsulation controller 15a sets parameters to encapsulator 150 so that encapsulator 150 performs encapsulation processing that adds, to the VM-packet originating from VM 11a, IP address "Address-B" as a destination tunnel address, and IP address "Address-A" as a source tunnel address. Here, the source tunnel address indicates an address assigned to a server operating a source virtual machine that has generated the VM-packet which is to be sent to a destination virtual machine using a communication tunnel, and the destination tunnel address indicates an address assigned to a server operating a destination virtual machine that receives the VM-packet sent from the source virtual machine using the communication tunnel. In the example of FIG. 2, description will be given of the case where encapsulation controller 15a includes three encapsulators 150 to 152. However, the embodiment is not limited to this. For example, encapsulation controller 15a may be configured to include the same number of encapsulators as the number of communication tunnels each coupling a pair of virtual machines.

Encapsulators 150 to 152, upon receiving VM-packets from inside packet handler 14a, encapsulate the received VM-packets, for example, according to a Generic Routing Encapsulation (GRE) protocol. Further, each of encapsulators 150 to 152 determines whether the received VM-packet is a target packet to be captured by a capture device or not, based on a virtual machine identifier identifying a source virtual machine that has generated the received VM-packet. For example, when VM 11a is being set as a target virtual machine on which capture processing is to be performed, any packet originating from VM 11a is determined to be a target packet to be captured by a capture device. When the received VM-packet is determined to be a target packet to be captured, each of encapsulators 150 to 152 adds, to the received VM-packet, as a transfer-destination address, an address assigned to a capture device or an address assigned to a mirroring router that transfers a copy of the encapsulated packet to the capture device.

For example, encapsulator 150, upon receiving a VM-packet from inside packet handler 14a, determines whether a transfer-destination address is being stored, in transfer destination table 18b depicted in FIG. 4, in association with a virtual machine identifier identifying source virtual machine that has generated the VM-packet, for example, in association with virtual machine identifier "VM-A1". In the case, since transfer-destination address "Address-X" is being stored in association with virtual machine identifier VM-A1, encapsulator 150 determines that the received VM-packet is a target packet to be captured. Then, encapsulator 150 extracts, from transfer destination table 18b, transfer-destination address "Address-X" associated with virtual machine identifier VM-A1. Thereafter, encapsulator 150 performs encapsulation processing on the received VM-packet so that address "Address-A" assigned to server 10a is set as a source address of the encapsulated packet and address "Address-B" assigned to server 10d operating destination virtual machine 11g is set as a destination address of the encapsulated packet. Further, encapsulator 150 adds address "Address-X" assigned to capture device 30, as a transfer-destination address, to the encapsulated packet. Here, it is also possible to adds an address assigned to a mirroring router, such as router 40c, as a transfer-destination address, to the encapsulated packet so that a copy of the encapsulated packet is transferred to capture device 30 by the mirroring router. Here, description will be given of encapsulation processing with reference to FIG. 6.

Figure 6:
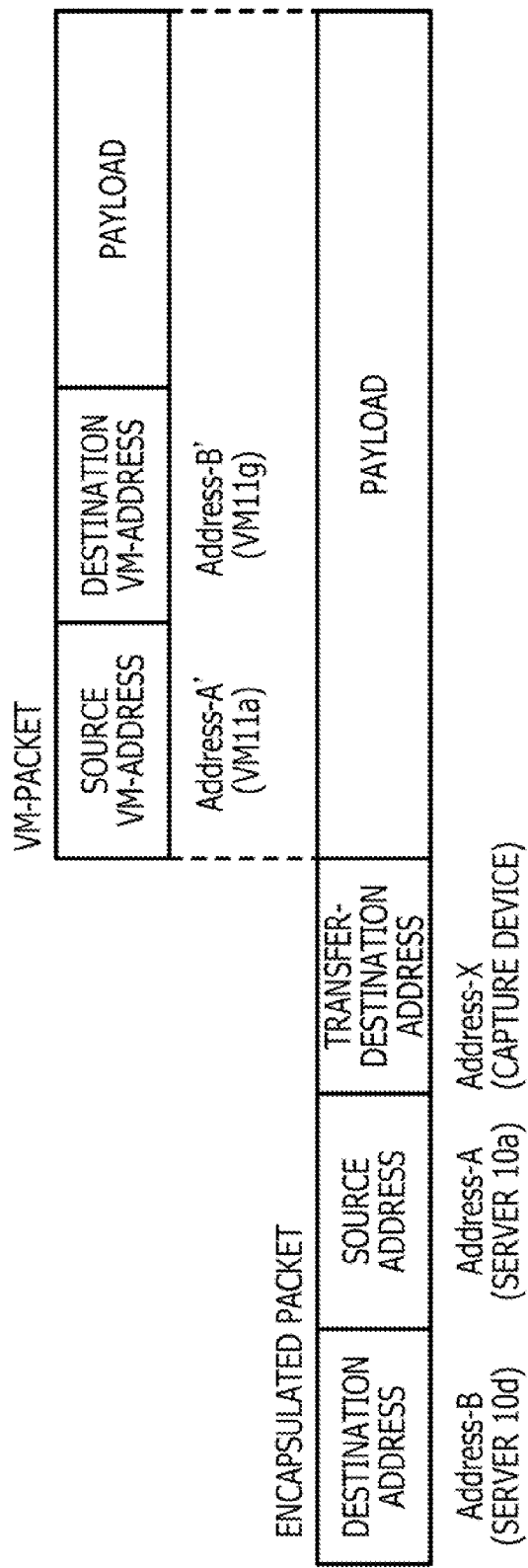
FIG. 6 is a diagram illustrating an example of a packet format, according to an embodiment.

FIG. 6 is a diagram illustrating an example of a packet format, according to an embodiment. In FIG. 6, a packet format labeled with "VM-PACKET" indicates a VM-packet on which encapsulation processing is not performed yet, and a packet format labeled with "ENCAPSULATED PACKET" indicates a packet generated by encapsulating the VM-packet. As depicted in FIG. 6, a VM-packet before encapsulation includes a source VM-address (for example, Address-A') a destination VM-address (for example, Address-B') and a payload. Here, source VM-address A' indicates a virtual address assigned to source virtual machine "VM 11a" being operated by server 10a, and destination VM-address B' indicates a virtual address assigned to destination virtual machine "VM 11g" being operated by server 10d.

An encapsulated packet depicted in FIG. 6 is generated by adding a destination address, a source address, and a transfer-destination address to a VM-packet depicted as depicted in FIG. 6. Here, for example, "Address-B" indicates an IP address assigned to server 10*d* by which destination virtual machine "VM 11*g*" is being operated, and "Address-A" indicates an IP address assigned to server 10*a* by which source virtual machine "VM 11*a*" is being operated. Further, "Address-X" indicates an IP address assigned to capture device 30, or mirroring router 40*c* that transfers a copy of the encapsulated packet to capture device 30. In the case, payload data of the encapsulated packet may be encrypted using encryption technology such as an IPsec (Security Architecture for Internet Protocol).

Outside packet handler 17*a* of FIG. 2 may be implemented, for example, as a NIC (Network Interface Card). Outside packet handler 17*a* sends the encapsulated packet to router 40*a* on a communication network. Further, outside packet handler 17*a* receives an encapsulated packet that has been transmitted from router 40*a* to server 10*a*.

In this way, when encapsulating a target VM-packet to be captured, server 10*a*, for example, adds the address assigned to capture device 30 to the encapsulated target VM-packet, as a transfer-destination address. As a result, the encapsulated packet including the target VM-packet may be transferred to capture device 30. Here, description will be given of processing for transferring the encapsulated packet to capture device 30.

Figure 7:
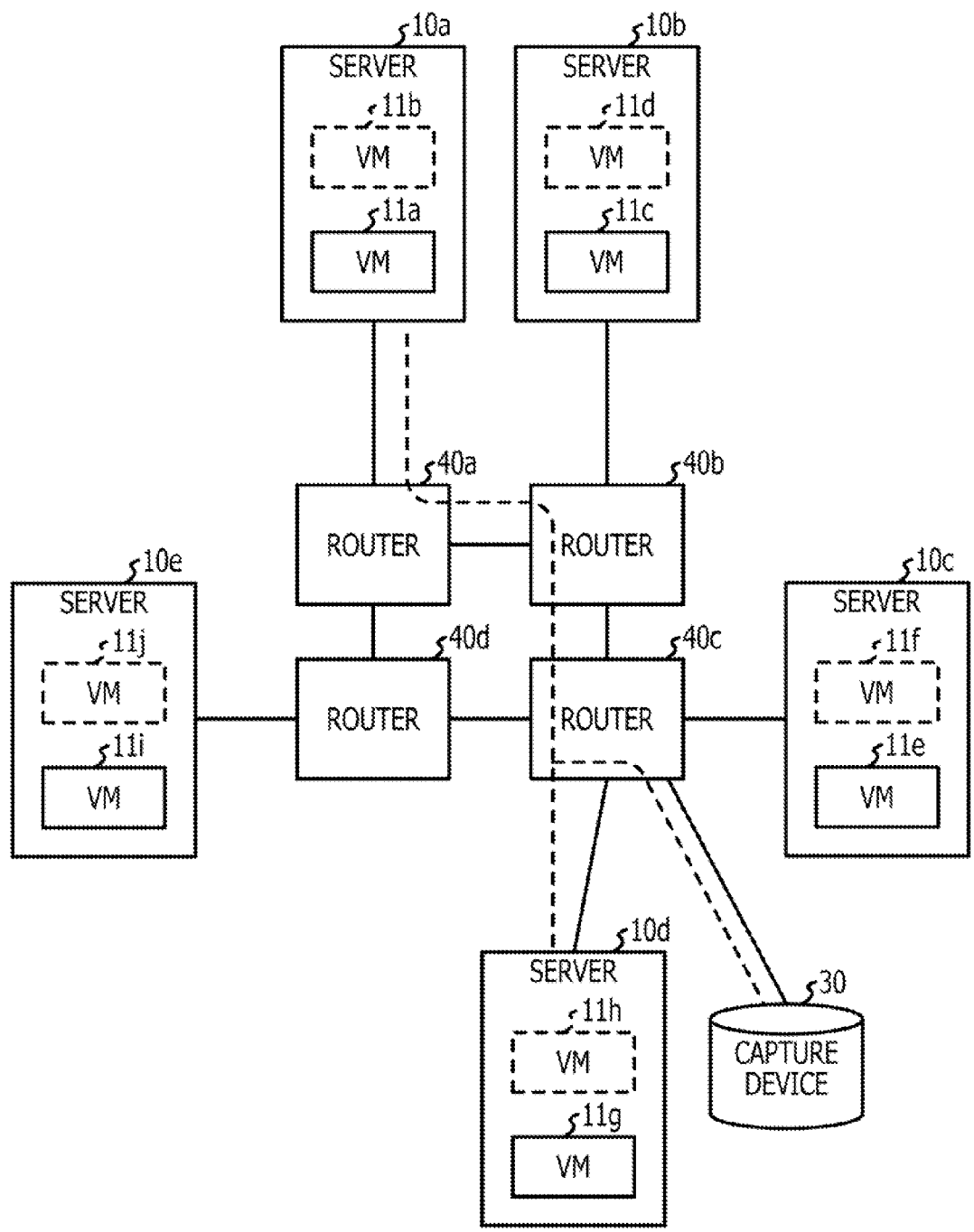
FIG. 7 is a schematic diagram illustrating an example of processing for transferring a packet to a capture device, according to an embodiment.

FIG. 7 is a schematic diagram illustrating an example of processing for transferring an encapsulated packet to a capture device, according to an embodiment. As illustrated in FIG. 7, server 10*a* encapsulates a target VM-packet to be captured by adding, to the target packet, the address assigned to capture device 30 or mirroring router 40*c* as a transfer-destination address, and transmits the encapsulated packet to a communication network. Then, the encapsulated packet is transferred, for example, to routers 40*q*, 40*b*, and 40*c* in this order.

Next, description will be given of processing performed by each of routers 40*a*, 40*b*, and 40*c* that have received the encapsulated packet, with reference to the example of FIG. 7. In the case, it is assumed that a destination of a VM-packet is VM 11*g* being operated by server 10*d*, and the address assigned to capture device 30 is being set as a transfer-destination address of the encapsulated packet. First, router 40*a* receives the encapsulated packet from server 10*a*, and determines whether a transfer-destination address is being set to the received encapsulated packet or not. In the case, since a transfer-destination address is being set to the received encapsulated packet, router 40*a* further determines whether the transfer-destination address indicates the address of router 40*a* or not. Here, since the transfer-destination address does not indicate the address of router 40*a*, router 40*a* transfers the encapsulated packet to router 40*b* according to the transfer-destination address being set to the encapsulated packet.

Next, in the similar manner, router 40*b* receives the encapsulate packet from router 40*a*, and determines whether a transfer-destination address is being set to the encapsulated packet or not. In the case, since a transfer-destination address is being set to the encapsulated packet, router 40*b* further determines whether the transfer-destination address indicates the address of router 40*b* or not. Here, since the transfer-destination address does not indicate the address of router 40*b*, router 40*b* transfers the encapsulated packet to router 40*c* according to the transfer-destination address being set to the encapsulated packet.

Router 40*c*, upon receiving the encapsulated packet from router 40*b*, determines whether a transfer-destination address is being set to the encapsulated packet or not. In the case, since the transfer-destination address is being set to the encapsulated packet, router 40*c* further determines whether the transfer-destination address indicates the address of router 40*c* or not. When the transfer-destination address indicates the address of router 40*c*, router 40*c* deletes the transfer-destination address from the received encapsulated packet, and transfers the encapsulated packet to server 10*d* according to a destination address being set to the encapsulated packet. At the same time, router 40*c* copies the received encapsulated packet, and transfers the copied packet to capture device 30 so that capture device stores the copied packet. Meanwhile, when the transfer-destination address indicates the address of capture device 30, router 40*c* transfers the received encapsulated packet to capture device 30.

Returning back to FIG. 2, outside packet handler 17*b* may be implemented as a NIC. Outside packet handler 17*b* receives a packet that is transmitted from router 40*e* arranged on the communication network to server 10*a*. For example, outside packet handler 17*b* receives via router 40*e* a transfer-destination setting message that stores a virtual machine identifier in association with a transfer-destination address, as illustrated in FIG. 8. Here, the transfer-destination setting message is defined as a message packet for setting, to transfer destination table 18*b*, information that associates a virtual machine identifier identifying a virtual machine that has generated a target VM-packet to be captured, with a transfer-destination address to which the target VM-packet is to be transferred. For example, the address of capture device 30 or the address of a mirroring router may be set as a transfer-destination address.

FIG. 8 is a schematic diagram illustrating an example of parameters that are set to a transfer-destination setting message, according to an embodiment. The transfer-destination setting message stores a virtual machine identifier identifying a source virtual machine that generates a target VM-packet, in association with a transfer-destination address. For example, the transfer-destination setting message stores virtual machine identifier "VM-A1" in association with transfer-destination address "Address-X", as depicted in the example of FIG. 8. That is, the transfer-destination setting message including parameters depicted in FIG. 8 indicates a message for setting information to transfer destination table 18*b* so that any VM-packet originating from VM 11*a* identified by VM-A1 is determined to be a target VM-packet to be captured, and transfer-destination address "Address-X" is added to the target VM-packet when encapsulating the target VM-packet.

Transfer-destination setting unit 19 receives a transfer-destination setting message from management device 20, and stores, in transfer destination table 18*b*, an identifier identifying a target virtual machine on which capture processing is to be performed, in association with a transfer-destination address, for example, the address of capture device 30 or the address of a mirroring router that transfers a copy of the encapsulated packet including the target VM-packet to capture device 30. Here, by performing capture processing on a virtual machine, any VM-packet originating from the virtual machine is captured by a capture-device. For example, upon receiving a transfer-destination setting message as depicted in FIG. 8, transfer-destination setting unit 19 extracts virtual machine identifier "VM-A1" from the received transfer-destination setting message, and determines a virtual machine identified by "VM-A1" to be a target virtual machine. Then, transfer-destination setting unit 19 stores transfer destination address "Address-X" included in the transfer-destination setting message, into a transfer-destination address field of an entry corresponding to extracted virtual machine identifier "VM-A1". As a result, VM 11*a* identified by VM-A1 is set as a target virtual machine on which capture processing is to be performed. Thereafter, when a VM-packet that has been generated by VM 11*a* identified by "VM-A1" is encapsulated, transfer-destination address "Address-X" is added to the encapsulated packet including the VM-packet. Next, description will be given of a configuration of management device 20 depicted in FIG. 1, with reference to FIG. 9.

Figure 9:
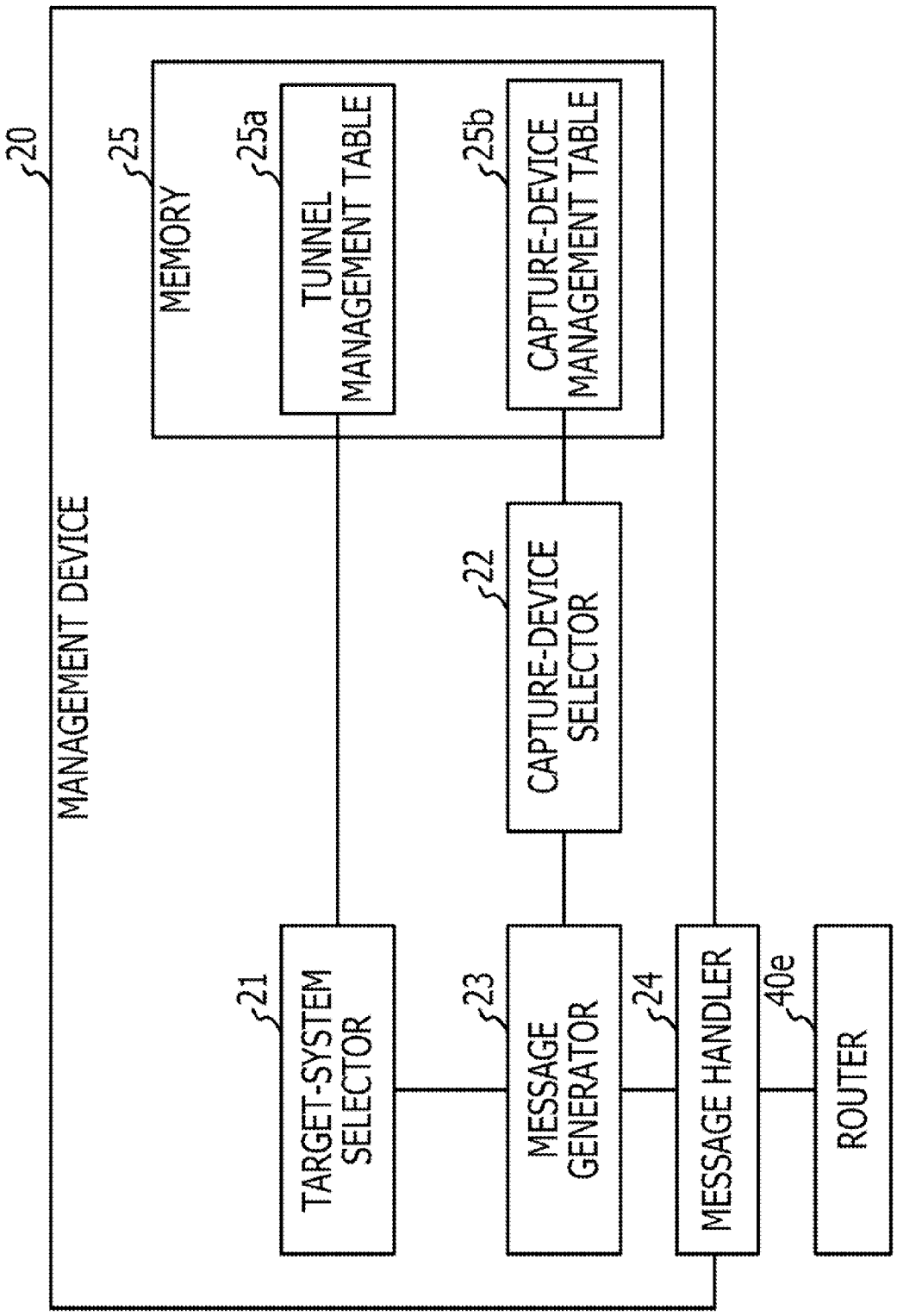
FIG. 9 is a diagram illustrating a configuration example of a management device, according to an embodiment.

FIG. 9 is a diagram illustrating a configuration example of a management device, according to an embodiment. As depicted in FIG. 9, management device 20 may be configured to include target-system selector 21, capture-device selector 22, message generator 23, message handler 24, and memory 25. Each of the components mentioned above will be described below.

Memory 25 is a memory for storing data and programs needed for various pieces of processing. Memory 25 stores, for example, tunnel management table 25*a* and capture-device management table 25*b*. Tunnel management table 25*a* is a table that stores a system identifier identifying each of customer systems being operated in a data center, in association with virtual machine identifiers identifying virtual machines belonging to the each of customer systems. Here, description will be given of tunnel management table 25*a* with reference the example of FIG. 10.

FIG. 10 is a diagram illustrating an example of a tunnel management table, according to an embodiment. As illustrated in the example of FIG. 10, tunnel management table 25*a* stores a system identifier (system ID) identifying a customer system, in association with one or more virtual machine identifiers each identifying a virtual machine belonging to the customer system identified by the system ID. For example, in the example of FIG. 10, tunnel management table 25*a* stores system ID "System1" in association with virtual machine identifiers: "VM-A1", "VM-B1", and "VM-C1". This means that VM-A1, VM-B1, and VM-C1 are virtual machine identifiers identifying virtual machines belonging to the customer system identified by "System1".

Capture-device management table 25*b* stores a capture-device identifier (capture-device ID) identifying each of one or more capture devices, in association with the address assigned to the each of the one or more capture devices. Here, description will be given of capture-device management table 25*b* using the example of FIG. 11.

FIG. 11 is a diagram illustrating an example of a capture-device management table, according to an embodiment. As depicted in the example of FIG. 11, capture-device management table 25*b* may be configured to store a capture-device ID identifying each of one or more capture devices, in association with a capture-device address assigned to the each of one or more capture devices.

For example, in the example of FIG. 11, capture-device ID "Cap1" is stored in association with capture-device address "Address-X", in capture-device management table 25*b*. In the case, since virtual network system 1 according to the first embodiment includes only one capture device, only a pair of capture-device ID "Cap1" and capture-device address "Address-X" is being stored in capture-device management table 25*b*. However, two or more entries may be stored in capture-device management table 25*b* when a plurality of capture devices are installed in virtual network system 1.

Target-system selector 21 acquires one or more target virtual machine identifiers each identifying a target virtual machine on which capture processing is to be performed. Here, the capture processing allows a capture device to capture any packet originating from the target virtual machine. For example, target-system selector 21 displays a list of customer systems on a screen, and receives, from an administrator, information on a customer system selected as a target system on which capture processing is to be performed. Then, target-system selector 21 searches tunnel management table 25*a* for an entry corresponding to a system-ID designated by the received information, and acquires all the virtual machine identifiers associated with the system-ID, from tunnel management table 25*a*.

Capture-device selector 22 acquires information on a capture device that is selected as an available capture device that is currently used for capturing packets originating from target virtual machines. For example, capture-device selector 22 displays a list of capture-device IDs on a screen based on capture-device management table 25*b*, and receives, from an administrator, information on a capture device that is selected as an available capture device. Then, capture-device selector 22 searches capture-device management table 25*b* for an entry corresponding to a capture-device ID identifying the selected available capture device indicated by the received information, to acquire an IP address associated with the capture-device ID. In the case, since virtual network system 1 according to the first embodiment includes only one capture device, capture-device ID "Cap1" identifying capture device 30 is displayed on the screen.

Message generator 23 generates a transfer-destination setting message using the virtual machine identifiers acquired by target-system selector 21 and the capture device address acquired by capture-device selector 22. For example, when virtual machine identifier "VM-A1" and capture-device address "Address-X" are acquired, message generator 23 generates a transfer-destination setting message that associates virtual machine identifier "VM-A1" with transfer-destination address "Address-X".

Message handler 24 transmits the transfer-destination setting messages generated by message generator 23 to servers 10*a* to 10*e* via router 40*e*. Here, it is assumed that management device 20 holds addresses of servers 10*a* to 10*e* to which the transfer-destination setting messages are to be transmitted.

Next, description will be given of processing performed by server 10*a* according to a first embodiment, with reference to FIGS. 12 and 13.

Figure 12:
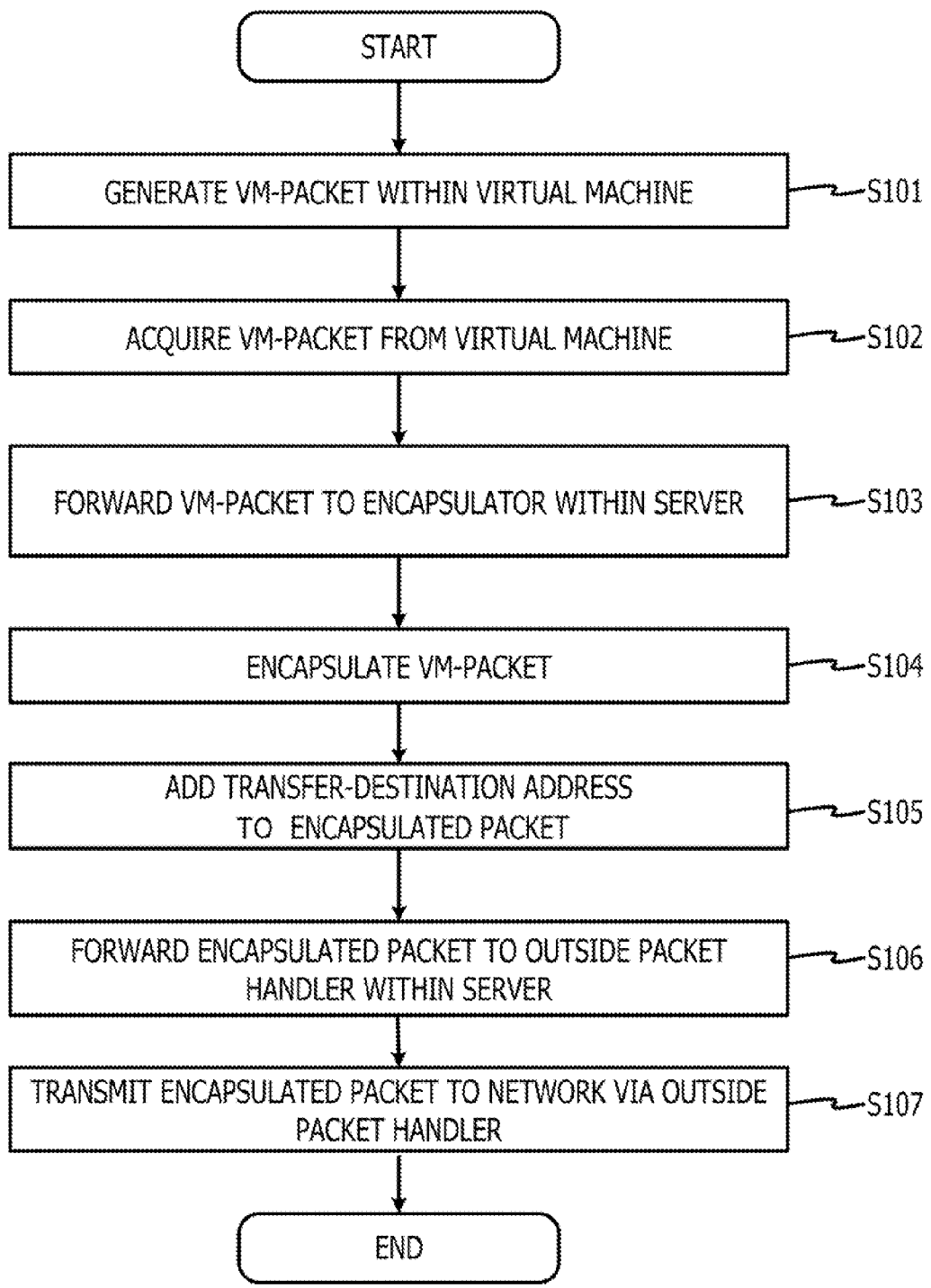
FIG. 12 is a diagram illustrating an example of an operational flowchart of a server, according to a first embodiment.

FIG. 12 is a diagram illustrating an example of an operational flowchart of a server, according to a first embodiment.

In operation S101, VM-packet generator 12*a* of VM 11*a* generates a VM-packet.

In operation S102, when transmitting the generated VM-packet to a destination virtual machine, for example, to VM 11*g*, VM-packet handler 13*a* of VM 11*a* sends the generated VM-packet to inside packet handler 14*a* of server 10*a*.

In operation S103, inside packet handler 14*a* of server 10*a* forwards the VM-packet to encapsulator 150 within server 10*a*.

In operation S104, encapsulator 150 of server 10*a* encapsulates the VM-packet by adding, to the VM-packet, the address of server 10*a* as a source address, and the address of server 10*d* that is operating destination virtual machine VM 11*g*, as a destination address.

In operation S105, encapsulator 150 further adds a transfer-destination address to the encapsulated packet when the VM-packet is determined to be a target packet to be captured. For example, encapsulator 150 determines whether the VM-packet is a target packet to be captured or not, by referring to transfer destination table 18*b*. That is, when a transfer-destination address is stored in association with a virtual machine identifier identifying a source virtual machine from which the VM-packet originates, the VM-packet is determined to be a target packet to be captured. When it is determined that the VM-packet is a target packet to be captured, encapsulator 150 adds the transfer-destination address to the encapsulated packet, where the address of capture device 30 or the address of a mirroring router that transfers a copy of the encapsulated packet to capture device 30 may be used as a transfer-destination address.

In operation S106, inside forwarding unit 16 extracts a destination address from the encapsulated packet, and determines outside packet handler 17a to be a forwarding destination within server 10a, by referring to second forwarding table 18c as illustrated in FIG. 5 using the extracted destination address of the encapsulated packet. Then, inside forwarding unit 16 forwards the encapsulated packet to outside packet handler 17a.

In operation S107, outside packet handler 17a transmits the encapsulated packet including the transfer-destination address to router 40a on the network so that the encapsulated packet is transmitted to a server operating the destination virtual machine while the encapsulated packet including the VM-packet is transferred to the transfer-destination address.

Figure 13:
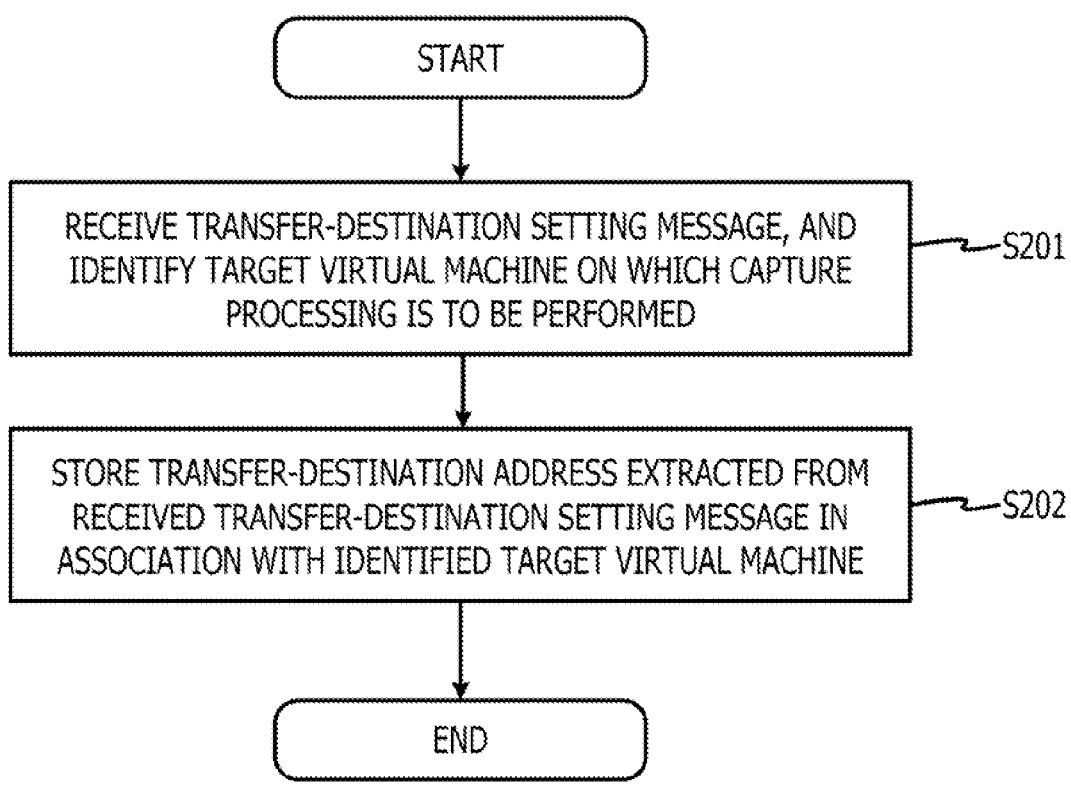
FIG. 13 is a diagram illustrating an example of an operational flowchart of transfer-destination setting processing performed by a server, according to a first embodiment.

FIG. 13 is a diagram illustrating an example of an operational flowchart of transfer-destination setting processing performed by a server, according to a first embodiment.

In operation S201, upon receiving a transfer-destination setting message from a management device, transfer-destination setting unit 19 of server 10a identifies a target virtual machine on which capture processing is to be performed using a virtual machine identifier extracted from the received transfer-destination setting message.

In operation S202, transfer-destination setting unit 19 selects, from transfer destination table 18b, an entry including the same virtual machine identifier as that extracted from the received transfer-destination setting message, and sets the transfer-destination address extracted from the received transfer-destination setting message, to an transfer-destination address field in the selected entry. Next, description will be given of processing performed by management device 20 according to a first embodiment, with reference to FIG. 14.

Figure 14:
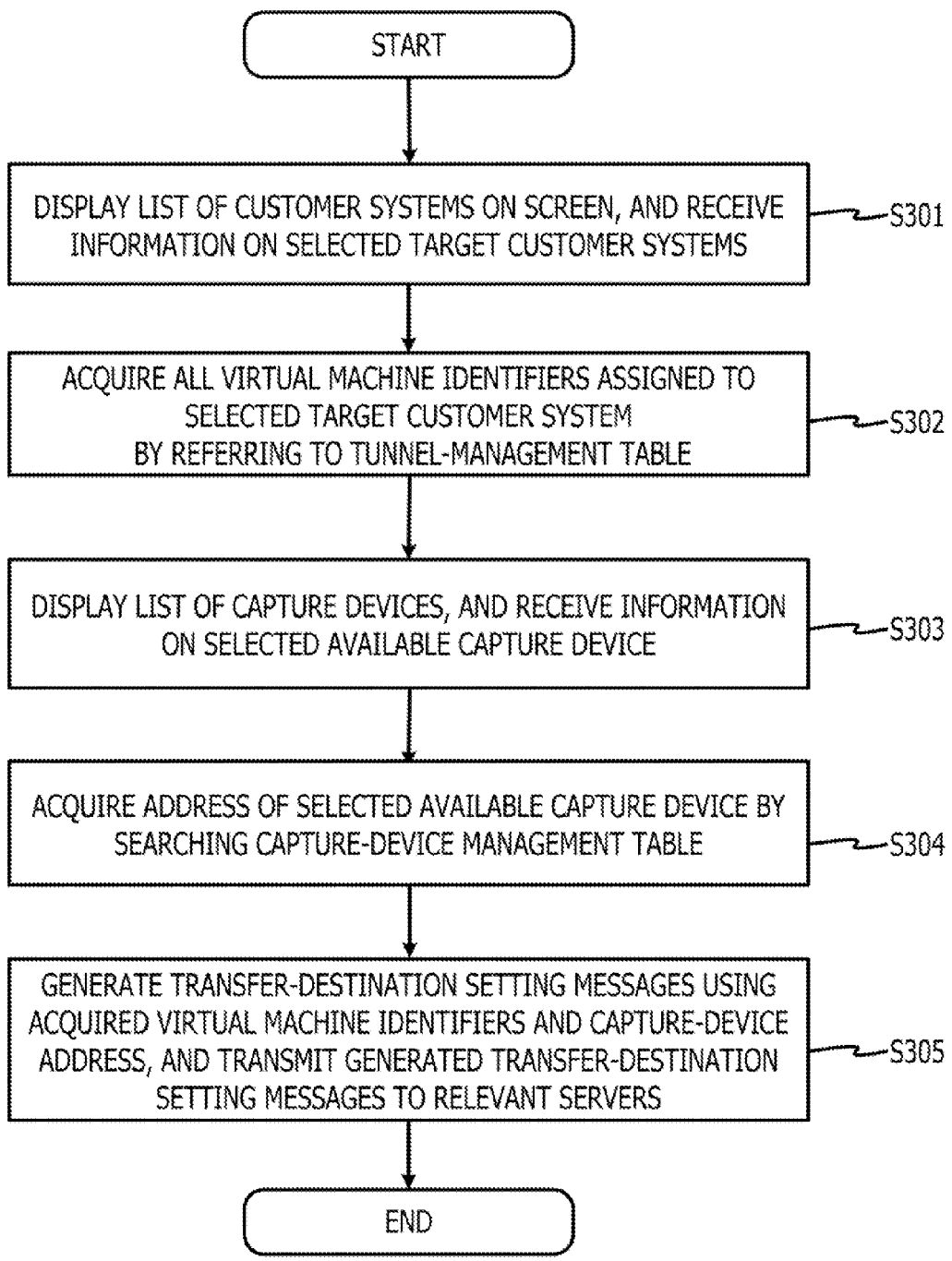
FIG. 14 is a diagram illustrating an example of an operational flowchart performed by a management device, according to an embodiment.

FIG. 14 is a diagram illustrating an example of an operational flowchart performed by a management device, according to a first embodiment.

In operation S301, target-system selector 21 of management device 20 displays a list of customer systems, and receives information identifying a target customer system, for example, selected by an administrator, on which capture processing is to be performed.

In operation S302, target-system selector 21 searches tunnel-management table 25a for an entry having a system identifier identifying the selected target customer system, and acquires all the virtual machine identifiers assigned to the selected target customer system.

In operation S303, capture-device selector 22 of management device 20 displays a list of capture-device identifiers, and receives information identifying a capture-device, for example, selected by an administrator.

In operation S304, capture-device selector 22 searches capture-device management table 25b for an entry having the selected capture-device identifier, and acquires address assigned to the capture device identified by the selected capture-device identifier.

In operation S305, message generator 23 of management device 20 generates transfer-destination setting messages using the acquired virtual machine identifiers and the acquired capture-device address. Then, message handler 24 of management device 20 transmits the generated transfer-destination setting messages to relevant servers operating virtual machines identified by the acquired virtual machine identifiers.

As mentioned above, server 10a acquires a VM-packet in which the address of VM 11a is set as a source VM-address and the address of VM11g is set as a destination VM-address, from VM 11a that is being operated by server 11a. Then server 10a encapsulates the received VM-packet by setting the address of server 10a operating source virtual machine VM 11a, as a source address, and by setting the address of server 10d operating destination virtual machine VM 11g, as a destination address. Further, server 10a adds to the encapsulated packet a transfer destination address, for example, the address of capture device 30 that captures a VM-packet flowing in the network. Thereafter, server 10a transmits the encapsulated packet including the transfer-destination address to the network so that the encapsulated packet is transmitted to a server operating the destination virtual machine while the encapsulated packet including the VM-packet is transferred to the transfer-destination address. This allows a VM-packet to be captured efficiently by a capture device having a transfer-destination address.

For example, since a transfer-destination address identifying capture device 30 is added to the encapsulated packet including the VM-packet so as to transfer the encapsulated packet to capture device 30, the number of capture devices to be installed is decreased, thereby reducing a cost. Further, since it is possible to configure a predetermined capture device to focus on capturing VM-packets that originate from a large number of virtual machines, it is unnecessary to merge a variety of capturing results captured by a plurality of capture devices into one result. Further, even if the arrangement of virtual machines or communication routes through which VM-packets are transmitted are changed, it is possible to capture intended VM-packets without rearranging the capture devices or re-establishing the communication routes in the network.

According to a first embodiment, server 10a determines whether a VM-packet is a target packet to be captured or not, according to a virtual machine identifier (VM-ID) identifying a target virtual machine on which capture processing is to be performed. When a VM-packet is a target packet to be captured, server 10a adds the address of capture device 30 as a transfer-destination address to the VM-packet. This allows capture device 30 to capture VM-packets originating from a predetermined arbitrary virtual machine using a virtual machine identifier identifying the predetermined arbitrary virtual machine.

Further, according to a first embodiment, management device 20 receives information identifying virtual machines each selected as a target virtual machine that generates a target packet to be captured. Management device 20 generates a transfer-destination setting message for requesting a server to add the address of capture device 30 as a transfer destination address to a VM-packet originating from the selected virtual machine (for example, VM 11a). Then, management device 20 transmits the generated transfer-destination setting message to each of servers that is operating the selected target virtual machines, for example, to server 10a. In this way, management device 20 may be configured to control a transfer destination of a VM-packet originating from a predetermined arbitrary virtual machine so that capture device 30 efficiently captures the VM-packet originating from the predetermined arbitrary virtual machine.

A Second Embodiment

In the first embodiment described above, whether a transfer-destination address is added to a VM-packet is determined depending on each of virtual machines from which the packet has originated. However, the present invention is not limited to this. For example, whether a transfer-destination address is added to a VM-packet or not may be determined depending on each pair of source and destination tunnel addresses, where the source tunnel address means an address assigned to a server operating a source virtual machine from which a VM-packet originates, and the tunnel destination address means an address assigned to a server operating a destination virtual machine at which the VM-packet arrives.

Description will be given of a second embodiment with reference to FIGS. 15 to 17, in which it is determined depending on each pair of source and destination tunnel addresses whether a transfer-destination address is added to the encapsulated packet or not. Since a server according to the second embodiment is configured in a manner similar to server 10a illustrated in FIG. 2, description of a configuration thereof will be omitted here.

FIG. 15 is a diagram illustrating an example of a transfer destination table, according to a second embodiment. As depicted in FIG. 15, in transfer destination table 18b that is held by server 10a according to the second embodiment, each pair of source and destination tunnel addresses is stored together with a virtual machine identifier and transfer-destination address. For example, as illustrated in the example of FIG. 15, a virtual machine identifier "VM-A1", source tunnel address "Address-A", destination tunnel address "Address-B", and transfer-destination address "Address-X" are stored in association with each other, in transfer destination table 18b. According to the transfer destination table illustrated in FIG. 15, when encapsulating a VM-packet that has originated from a virtual machine identified by "VM-A1" and is to be transmitted using a communication tunnel having source tunnel address "Address-A" and destination tunnel address "Address-B", transfer-destination address "Address-X" is added to the encapsulated packet.

FIG. 16 is a diagram illustrating an example of parameters that are set to a transfer-destination setting message, according to a second embodiment. As illustrated in FIG. 16, a transfer-destination setting message according to the second embodiment stores a pair of source and destination tunnel addresses together with a virtual machine identifier and a transfer-destination address so that the pair of source and destination tunnel addresses is set to a transfer destination table, together with the virtual machine identifier and the transfer-destination address.

For example, as illustrated in the example of FIG. 16, the transfer-destination setting message stores virtual machine identifier "VM-A1", source tunnel address "Address-A", destination tunnel address "Address-B", and transfer-destination address "Address-X", in association with each other. That is, the transfer-destination setting message, to which the parameters as depicted in FIG. 16 are set, functions as a command message requesting a server to handle a VM-packet that has been generated by a virtual machine identified by "VM-A1" and is to be transmitted using a communication tunnel having source tunnel address "Address-A" and destination tunnel address "Address-B", as a target packet to be captured. That is, the server adds transfer-destination address "Address-X" to the VM-packet when encapsulating the VM-packet.

Further, management device 20 may be configured to include a tunnel management table as illustrated in FIG. 17.

FIG. 17 is a diagram illustrating an example of a tunnel management table, according to a second embodiment. As illustrated in FIG. 17, tunnel management table 25a may be configured to store a system identifier (System-ID) and a virtual machine identifier in association with a pair of source and destination addresses. For example, as illustrated in FIG. 17, tunnel management table 25a stores virtual machine identifiers VM-A1, VM-B1, and VM-C1, in association with system identifier "System1" identifying a customer system.

Further, the example of FIG. 17 indicates that, out of VM-packets generated by a virtual machine identified by identifier VM-A1, a VM-packet that is to be transmitted using a communication tunnel having a pair of source tunnel address "Address-A" and destination tunnel address "Address-B" is determined to be a candidate for a target packet to be captured. Further, out of VM-packets generated by a virtual machine identified by identifier VM-A1, a VM-packet that is to be transmitted using a communication tunnel having a pair of source tunnel address "Address-C" and destination tunnel address "Address-D" is determined to be a candidate for a target packet to be captured.

As mentioned above, according to a second embodiment, server 10a determines whether the generated VM-packet is a target packet to be captured or not, depending on a pair of source and destination tunnel addresses assigned to a communication tunnel via which a VM-packet is transmitted from a source virtual machine to a destination virtual machine, where the tunnel source address indicates an address assigned to a server operating the source virtual machine, and the tunnel destination address indicates an address assigned to a server operating the destination virtual machine. When it is determined that the generated VM-packet is a target packet to be captured, server 10a encapsulates the generated VM-packet by adding, to the VM-packet, the address of capture device as a transfer-destination address in addition to source and destination addresses where the source tunnel address is set as a source address and the destination tunnel address is set as a destination address. This allows capture device 30 to capture a VM-packet that is transmitted via a predetermined arbitrary communication tunnel.

A Third Embodiment

In the first and second embodiments described above, an address assigned to one of a capture device or a mirroring router that transfers a copy of a target packet to the capture device is set to the encapsulated packet as a transfer-destination address. However, embodiments are not limited to this. According to a third embodiment, an address of an intermediate router is further set as a transfer-destination address, in addition to the address of a capture device. That is, by setting both addresses of a capture device and an intermediate router as transfer-destination addresses, a transmission route of the encapsulated packet is changed to pass through the intermediate router while the encapsulated packet is transferred to the capture-device. Here, with reference to FIG. 18, description will be given of processing for changing a transmission route of a packet by setting both addresses of a capture device and an intermediate router as transfer-destination addresses.

Figure 18:
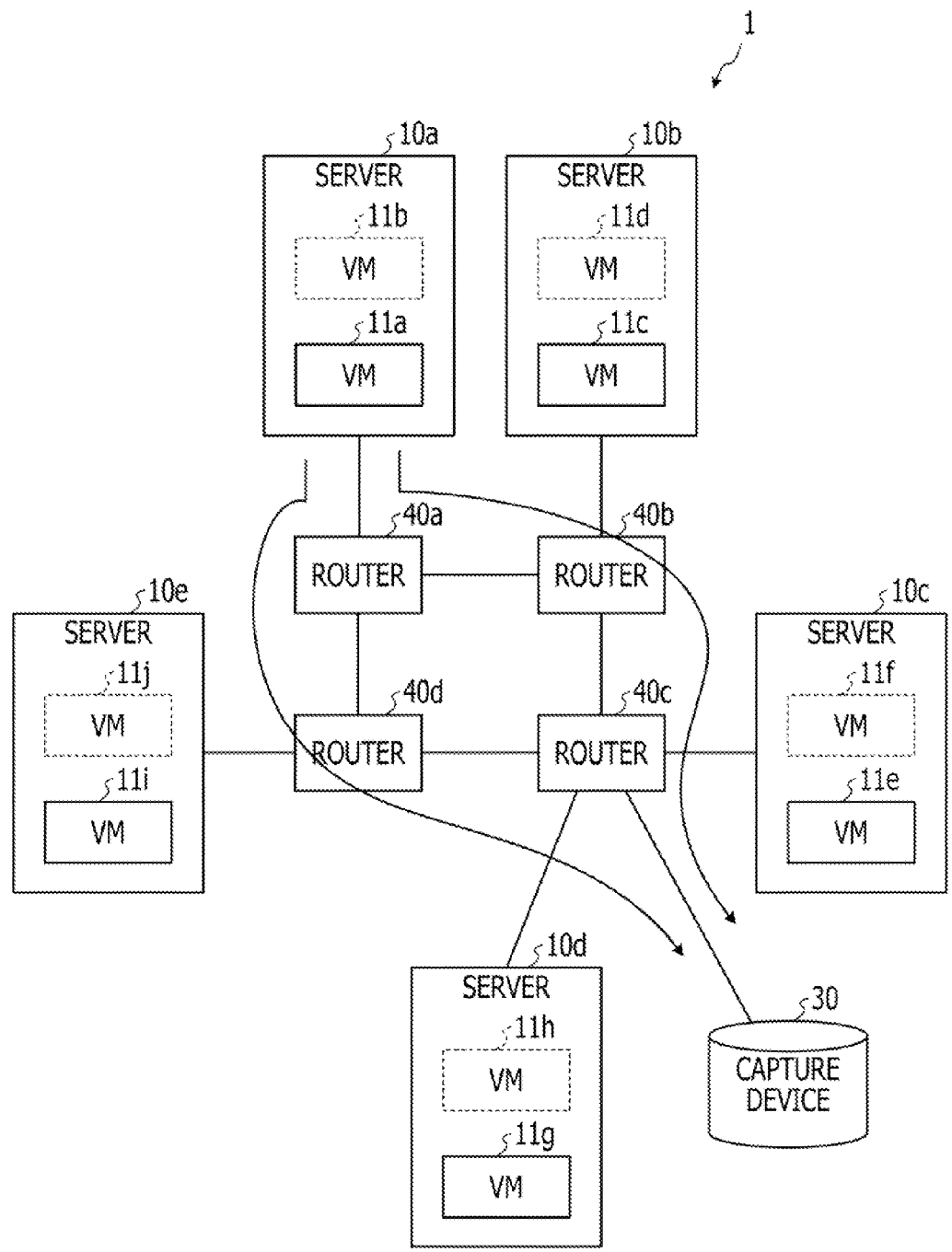
FIG. 18 is a schematic diagram illustrating an example of processing for changing a transmission route, according to a third embodiment.

FIG. 18 is a schematic diagram illustrating an example of processing for changing a transmission route, according to a third embodiment. As illustrated in FIG. 18, when server 10a transmits a target packet to be captured with setting only an address of capture device 30 as a transfer-destination address, there exist first and second transmission routes along which the target packet is able to be transferred, where the first transmission route is a route passing through routers 40a, 40b, and 40c in this order, and the second transmission route is a route passing through routers 40a, 40d, and 40c in this order. In the case, when only an address of capture device 30 is added to a packet as a transfer-destination address, server 10a from which the encapsulated packet is transmitted is unable to determines a transmission route along which the encapsulated packet is transferred until arriving at capture-device 30.

Meanwhile, by setting both addresses of a capture-device and an intermediate router to the encapsulated packet, not only the encapsulated packet is transferred to the capture device, but also server 10a from which the encapsulated packet is transmitted is able to determine a transfer route along which the encapsulated packet is transferred. For example, server 10a is able to transfer the encapsulated packet along a transmission route passing through routers 40a, 40d, and 40c in this order, by setting, as transfer-destination addresses, both the address of capture device 30, "Address-X", and the address of intermediate router 40d, "Address-M".

In the third embodiment described below, description will be given of a case in which the address of an intermediate router is set as one of transfer-destination addresses, together with the address of capture-device. Since a server according to the third embodiment is configured in a manner similar to server 10a illustrated in FIG. 2, the description thereof will be omitted here.

FIG. 19 is a diagram illustrating an example of a transfer destination table, according to a third embodiment. As illustrated in FIG. 19, a plurality of transfer-destination addresses, "Address-M" and "Address-X", are stored in association with one virtual machine identifier "VM-A1". This means that when encapsulating a VM-packet generated by a virtual machine identified by "VM-A1", two addresses "Address-M" and "Address-X" are added to the encapsulated packet as transfer-destination addresses.

Figure 20:
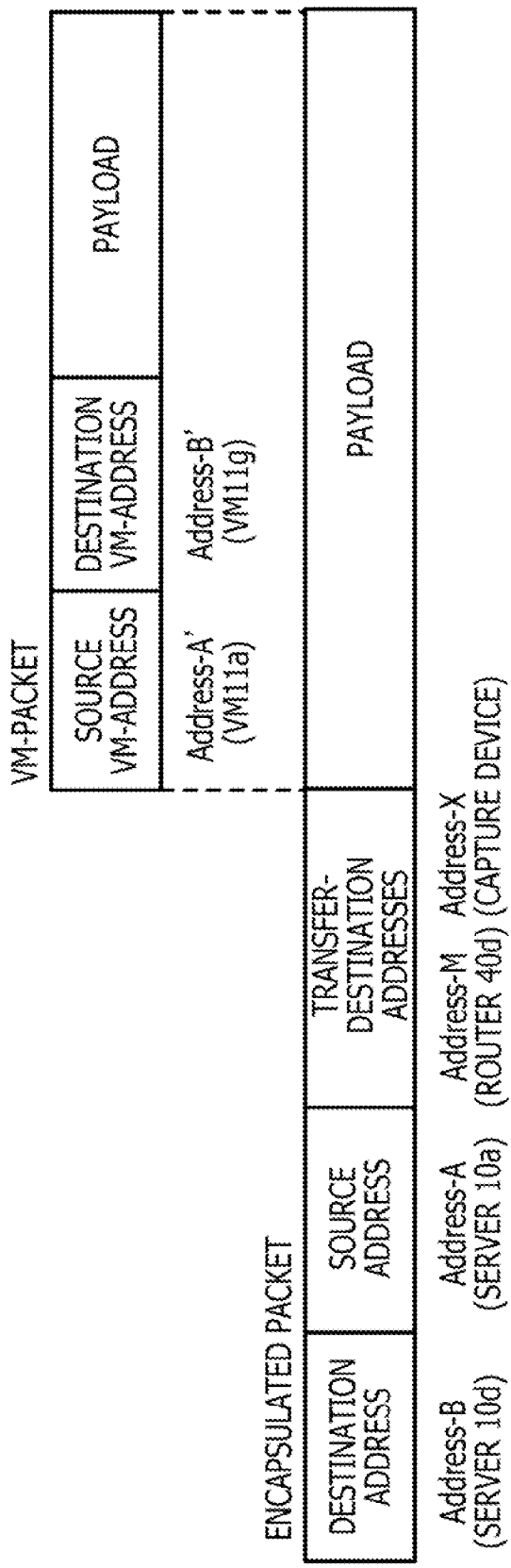
FIG. 20 is a diagram illustrating an example of a packet format, according to a third embodiment.

FIG. 20 is a diagram illustrating an example of a packet format, according to a third embodiment. Server 10a according to the third embodiment refers to transfer destination table 18b of FIG. 19 when encapsulating a VM-packet generated by virtual machine VM 11a identified by VM-A1. Then, server 10a extract transfer-destination addresses "Address-M" and "Address-X" from transfer destination table 18b.

Thereafter, server 10a encapsulates the VM-packet so that address "Address-A" assigned to server 10a is set as a source address, and address "Address-B" assigned to a server operating a destination virtual machine is set as a destination address. Further, server 10a adds, as transfer-destination addresses, addresses "Address-X" and "Address-M" that are assigned to capture-device 30 and an intermediate router, respectively, to the encapsulated packet.

In this way, by encapsulating a VM-packet so that both intermediate router address "Address-M" and the address of capture-device 30 are added as transfer-destination addresses, source server 10a may determine a transmission route along which the encapsulated packet is to be transferred to capture-device 30.

As mentioned above, according to a third embodiment, server 10a may be configured to encapsulate a VM-packet by adding, as transfer-destination addresses, an address of an intermediate router together with an address of a capture-device for capturing a packet flowing in a communication network. This allows server 10a to beforehand determine a transmission route along which the encapsulated packet is to be transferred to the capture device. That is, the encapsulated packet may be transmitted along a predetermined arbitrary transmission route so as to be captured by capture-device 30.

A Fourth Embodiment

In the above examples according to the first, second, and third embodiments, it is assumed that single capture device is used. However, the present invention is not limited to this, and a plurality of capture devices may be used for capturing a target packet. Further, it is also possible to configure a management device so that an administrator selects, from the plurality of capture-devices, a capture-device to which target packets are to be transferred. Here, description will be given of processing for selecting a capture-device to which target packets are to be transferred.

Figure 21:
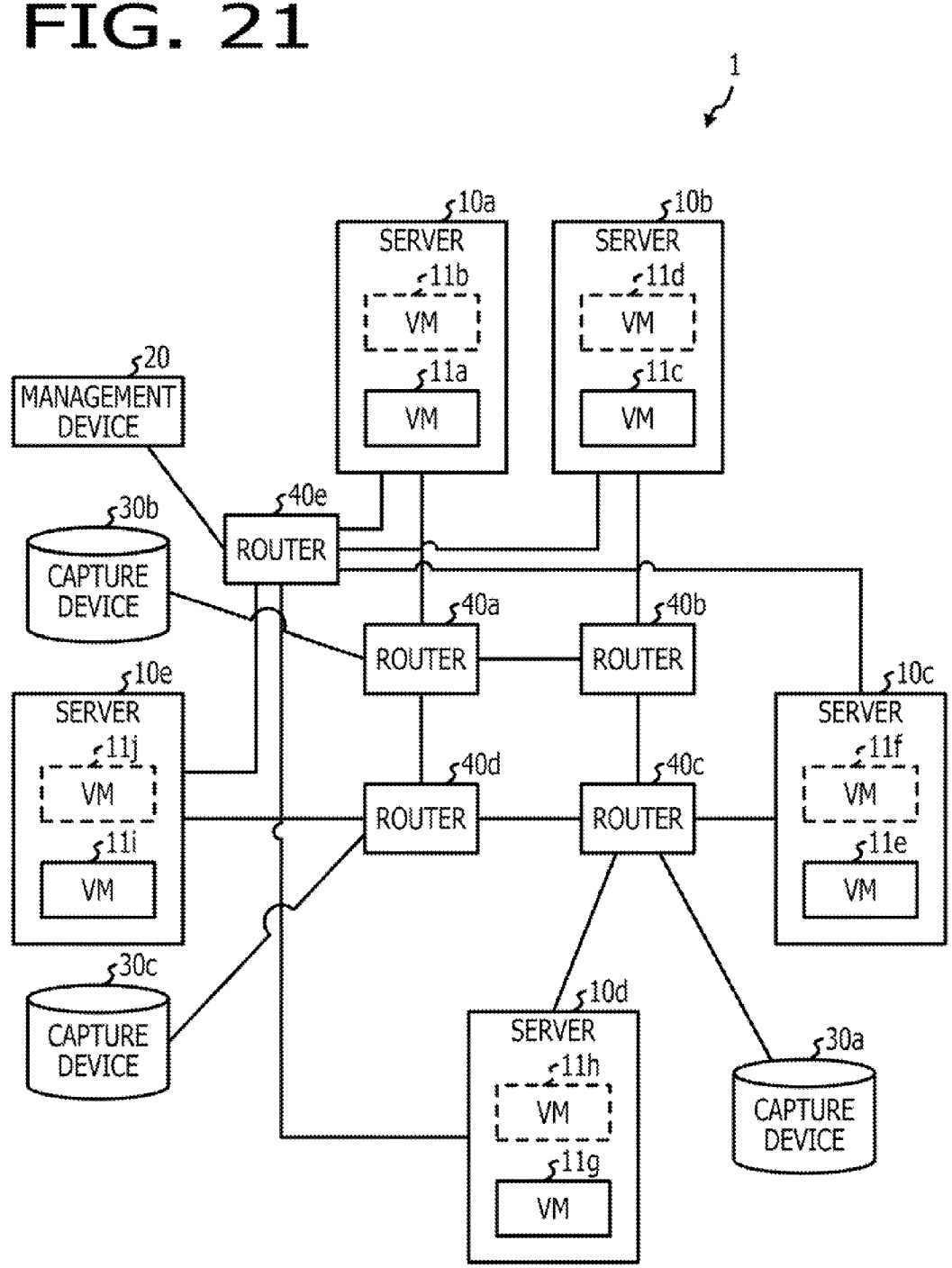
FIG. 21 is a diagram illustrating a configuration example of a virtual network system, according to a fourth embodiment.

FIG. 21 is a diagram illustrating a configuration example of a virtual network system, according to a fourth embodiment. As depicted in FIG. 21, according to the fourth embodiment, a plurality of capture-devices, for example, capture devices 30a, 30b, and 30c are arranged in a network. Management device 20 may be configured to select, from the plurality of capture-devices, an available capture device that is currently to be used for capturing a target packet. In the case, when the available capture device is selected, management device 20 notifies each of servers 10a to 10e of the address assigned to the selected available capture device.

In the following examples according to the fourth embodiment, description will be given of the case where a management device selects, from a plurality of capture-devices, an available capture device to which a target packet is to be transferred. A management device according to the fourth embodiment may be configured in a manner similar to management device 20 of FIG. 9, and description of a configuration thereof will be omitted here.

FIG. 22 is a diagram illustrating an example of a capture-device management table, according to a fourth embodiment. Capture-device management table 25b is configured as a table that stores a capture-device identifier identifying each of a plurality of capture devices, in association with an address assigned to the each of the plurality of capture-devices. In the example of FIG. 22, capture-device identifiers "Cap1", "Cap2", and "Cap3" are stored in capture-device management table 25b, in association with capture-device addresses "Address-X", "Address-Y", and "Address-Z", respectively. Here, it is also assumed that capture-device identifiers "Cap1", "Cap2", and "Cap3" identify capture device 30a, 30b, and 30c of FIG. 21, respectively.

Capture-device selector 22 displays on a screen a list of capture-device identifiers extracted from capture-device management table 25b, and waits for receiving a capture-device identifier identifying a capture device that is selected from the plurality of capture-devices (for example, capture-devices 30a to 30c) by an administrator. Then, the capture-device selector 22 search capture-device management table 25b for a capture-device address associated with the selected capture-device identifier. For example, when capture-device identifier "Cap2" is selected, capture-device selector 22 searches the capture-device management table 25b for capture-device address associated with capture-device identifier "Cap2", to acquire capture-device address "Address-Y".

Thereafter, message generator 23 generates, for example, a transfer-destination setting message that stores virtual machine identifier "VM-A1" in association with the selected capture-device address "Address-Y". Then, message handler 24 transmits the generated transfer-destination setting message to server 10a operating VM 11a identified by VM-A1.

As mentioned above, according to the fourth embodiment, management device 20 selects one of a plurality of capture devices as an available capture device that captures a VM-packet originating from a target virtual machine, for example, VM 11a. Then, management device 20 generates a transfer-destination setting message for requesting a server to add the address of the selected available capture-device as a transfer-destination address when encapsulating a target VM-packet.

This allows a capture-device selected by an administrator to capture a VM-packet originating from a target virtual machine.

A Fifth Embodiment

In the above example according to the fourth embodiment, description was given of the case where an administrator selects, from a plurality of capture devices, a capture device that captures a VM-packet originating from a target virtual machine on which capture processing is to be performed. However, the present invention is not limited to this, and it is also possible to select an available capture device based on an operational state of the network.

According to a fifth embodiment, an available capture device for capturing a packet is selected based on an operational state of a network. A configuration and processing of a management device according to a fifth embodiment will be described below with reference to FIGS. 23 to 25.

Figure 23:
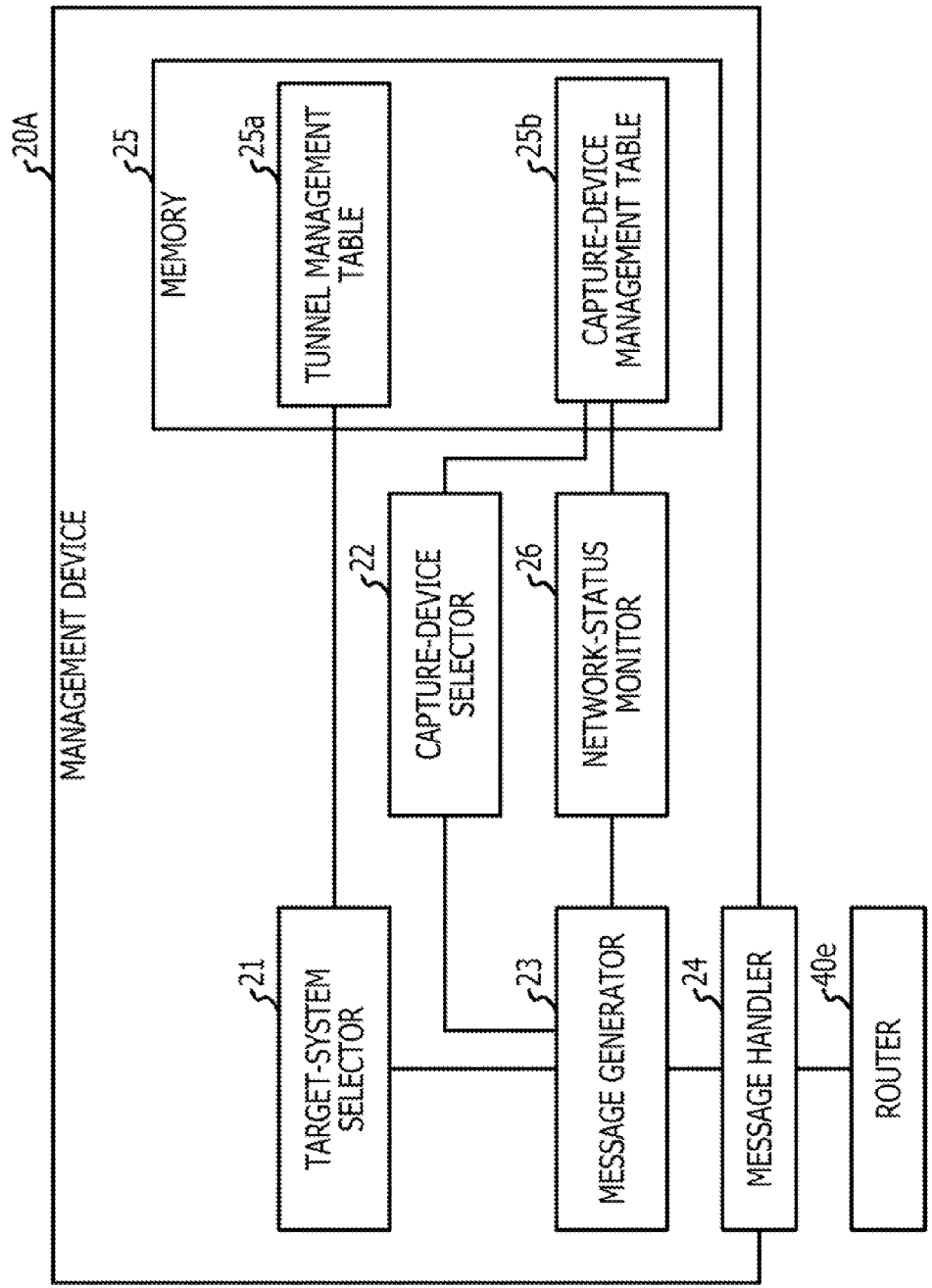
FIG. 23 is a diagram illustrating a configuration example of a management device, according to a fifth embodiment.

FIG. 23 is a diagram illustrating a configuration example of a management device, according to a fifth embodiment. As depicted in FIG. 23, management device 20A according to the fifth embodiment differs from management device 20 of FIG. 9 in that management device 20A further includes network-status monitor 26. Network-status monitor 26 acquires information on a network load being imposed on each of capture devices 30a to 30c, and stores the acquired information on network loads in capture-device management table 25b. For example, network-status monitor 26 acquires, as information on a network load, the number of input packets that have been inputted to a router connected to each of capture-devices 30a to 30c, at predetermined intervals, and stores the acquired information on network loads in capture-device management table 25b. Here, it is also possible to configure network-status monitor 26 to acquire, as information on a network load, either the number of output packets that have been outputted from the router instead of the number of input packets, or the total number of input and output packets that have been inputted to and outputted from the router, respectively.

FIG. 24 is a diagram illustrating an example of a capture-device management table, according to a fifth embodiment. As depicted in FIG. 24, capture-device management table 25b stores information on a network load in association with a capture-device identifier and a capture-device address. In the example of FIG. 24, for example, capture-device management table 25b indicates that network loads of capture-devices 30a, 30b, and 30c identified by respective capture-device identifiers "Cap1", "Cap2", and "Cap3" are 200000, 400000, and 500000, respectively. That is, capture-device 30a identified by capture-device identifier "Cap1" has the lowest network load, and capture-device 30c identified by capture-device identifier "Cap3" has the highest network load.

Capture-device selector 22 selects an available capture device to which a target packet is to be transferred, based on network loads being imposed on the plurality of capture devices. For example, capture-device selector 22 may be configured to select, as an available capture device, a capture device having the lowest network load among the plurality of capture devices. Further, it is also possible to configure capture-device selector 22 so that capture-device selector 22 displays one or more capture devices having a network load lower than or equal to a predetermined threshold value, and waits for receiving information on an available capture device that is selected, by an administrator, from the one or more capture devices.

Figure 25:
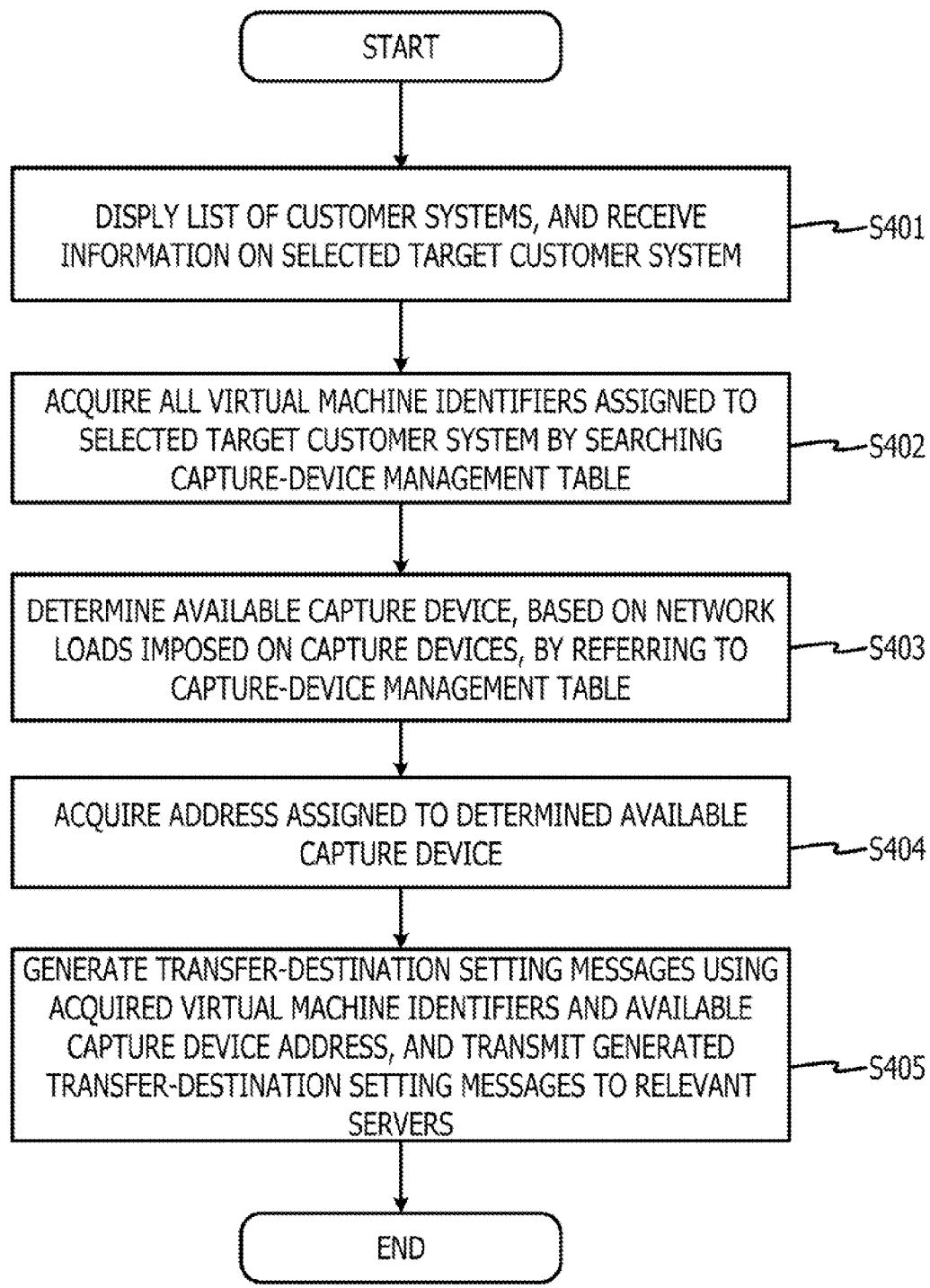
FIG. 25 is a diagram illustrating an example of an operational flowchart performed by a management device, according to a fifth embodiment.

FIG. 25 is a diagram illustrating an example of an operational flowchart performed by a management device, according to a fifth embodiment.

In operation S401, management device 20A displays a list of customer systems, and receives information on a target customer system that is selected, by an administrator, as a customer system on which capture processing is to be performed.

In operation S402, management device 20A searches tunnel management table 25a for an entry corresponding to the selected customer system, and acquires all the virtual-machine identifiers assigned to the selected customer system.

In operation S403, capture-device selector 22 acquires a network load for each of routers connected to a plurality of capture devices. Then, capture-device selector 22 selects an available capture device, from the plurality of capture devices (for example, capture devices 30a to 30c), based on the acquired network loads. For example, capture-device selector 22 selects, as an available capture device, a capture device having the lowest network load among the plurality of capture-devices.

In operation S404, capture-device selector 22 searches capture-device management table 25b using the capture-device identifier identifying the selected available capture device, to acquire an address assigned to the selected available capture device.

In operation S405, message generator 23 generates transfer-destination setting messages using the acquired virtual machine identifiers and the acquired capture device address. Then, message handler 24 transmits the generated transfer-destination setting message to each of servers operating the virtual machines identified by the acquired virtual machine identifiers.

In this way, according to the fifth embodiment, management device 20A acquires information on network loads for routers 40a, 40c, and 40d connected to capture devices 30a, 30b, and 30c, respectively. Then, management device 20A may select, as an available capture device, a capture device connected to a router having a lower network load. This allows a target packet to be captured by a capture-device that is appropriate in terms of a network load.

A Sixth Embodiment

In the above example according to the fourth embodiment, description was given of the case where an administrator selects, from a plurality of capture-devices, an available capture device by which a target packet is to be captured. However, the present invention is not limited to this, and it is also possible to select an available capture device based on an operational state of each of capture devices.

According to a sixth embodiment, an available capture device used for capturing a target packet is selected based on an operational state of each of a plurality of capture devices. Examples for a configuration and processing of a management device according to the sixth embodiment will be described below with reference to FIGS. 26 to 28.

Figure 26:
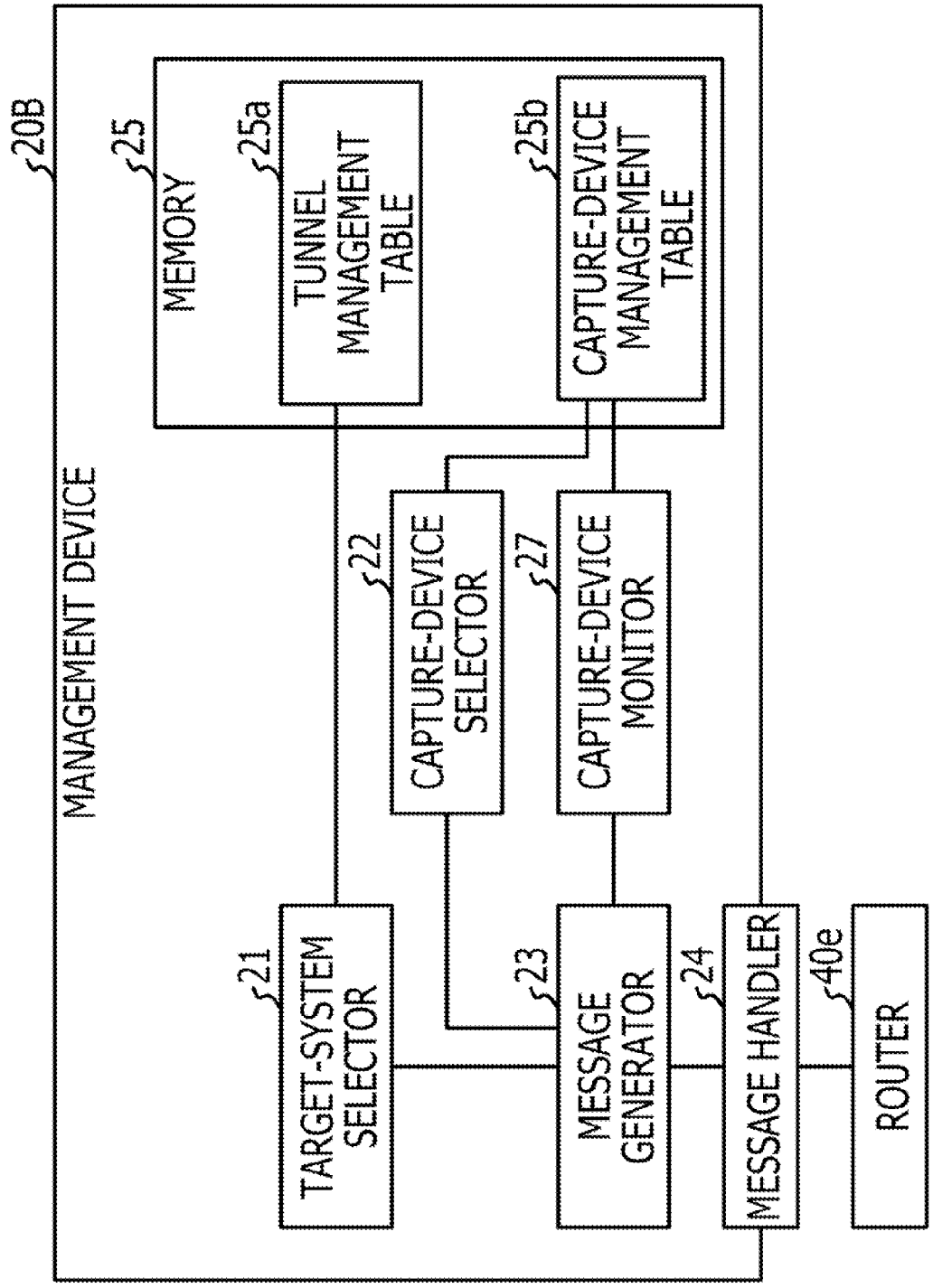
FIG. 26 is a diagram illustrating a configuration example of a management device, according to a sixth embodiment.

FIG. 26 is a diagram illustrating a configuration example of a management device, according to a sixth embodiment. As depicted in FIG. 26, management device 20B according to the sixth embodiment differs from management device 20 of FIG. 9, in that management device 20B further includes capture-device monitor 27. Capture-device monitor 27 acquires an operational state for each of capture devices 30a to 30c, and stores the acquired operational states into capture-device management table 25b. For example, capture-device monitor 27 acquires, as an operational state, information on the size of available storage area and a CPU load being imposed on each of capture devices 30a to 30c, and stores the acquired information in capture-device management table 25b.

FIG. 27 is a diagram illustrating an example of a capture-device management table, according to a sixth embodiment. As depicted in FIG. 27, capture-device management table 25b stores the size of an available storage area and a CPU load in association with a capture-device identifier and a capture-device address. In the example of FIG. 27, capture device 30a identified by capture-device identifier "Cap1" is having 500 GB available storage area and being operated under a CPU load of 70%. Capture-device 30b identified by capture-device identifier "Cap2" is having 300 GB available storage area and being operated under a CPU load of 50%. Capture-device 30c identified by capture-device identifier "Cap3" is having 100 GB available storage area and being operated under a CPU load of 30%.

Capture-device selector 22 selects, from a plurality of capture devices, an available capture device to which a target packet is to be transferred, based on an operational state of each of the plurality of capture devices. For example, capture-device selector 22 selects, as an available capture device, a capture device having the largest available storage area among the plurality of capture-devices. Further, capture-device selector 22 may be configured to select, as an available capture device, a capture device having the smallest CPU load among the plurality of capture-devices. It is also possible to configure capture-device selector 22 to select, as an available capture device, a capture device having the smallest CPU load among capture-devices each having an available storage area greater than or equal to a predetermined threshold value.

Figure 28:
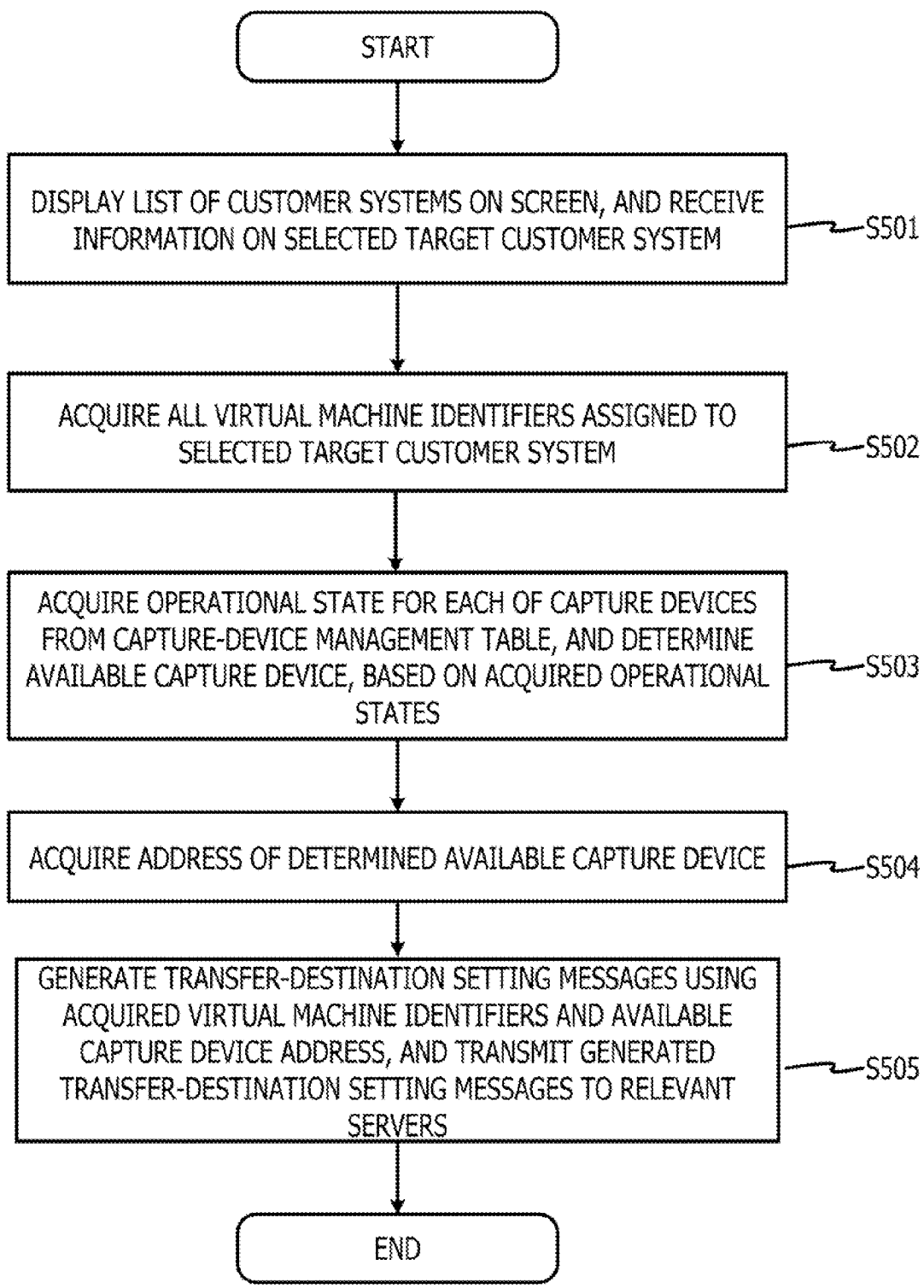
FIG. 28 is a diagram illustrating an example of an operational flowchart performed by a management device, according to a sixth embodiment.

FIG. 28 is a diagram illustrating an example of an operational flowchart performed by a management device, according to a sixth embodiment.

In operation S501, management device 20B displays a list of customer systems on a screen, and receives information on a target customer system that is selected as a customer system on which capture processing is to be performed.

In operation S502, management device 20B acquires all the virtual machine identifiers assigned to the selected customer system by searching tunnel-management table 25a using a system identifier identifying the selected target customer system.

In operation S503, capture-device selector 22 of management device 20B acquires an operational state for each of the plurality of capture-devices 30a to 30c, from capture-device management table 25b, and determines an available capture device to be used, based on the acquired operational states. For example, capture-device selector 22 may select, as an available capture device, a capture device having the largest available storage area among the plurality of capture devices.

In operation S504, capture-device selector 22 acquires an address of the determined available capture device, by searching capture-device management table 25b using a capture-device identifier identifying the determined available capture device.

In operation S505, message generator 23 generates transfer-destination setting messages using the acquired virtual machine identifiers and available capture device address. Then, message handler 24 transmits the generated transfer-destination setting messages to the relevant servers operating virtual machines identified by the acquired virtual machine identifiers.

In this way, according to a sixth embodiment, management device 20B acquires information on an operational state for each of a plurality of capture-devices 30a to 30c, and determines an available capture device to be used, based on the acquired operational states. For example, management device 20B determines, as an available capture device, a capture device having the largest available storage area or having the smallest CPU load among the plurality of capture-devices. This allows management device 20B to select an available capture device that is appropriate in terms of operational states of the plurality of capture-devices.

A Seventh Embodiment

The present invention may be implemented as a various types of embodiments other than the embodiments described above. Configuration elements (components) depicted in the figures are functional or conceptual ones, and it is not required that those configuration elements are being configured physically as depicted in the figures. That is, configurations for distributing or integrating the configuration elements are not limited to those depicted in the figures, and all or some portions of the configuration elements may be configured by distributing or integrating them using arbitrary functional or physical units, depending on various loads and usage states. For example, VM-packet generator 12a and VM-packet handler 13a may be integrated to one component.

Further, out of pieces of processing described in the embodiments, all or some pieces of processing that are described as being performed automatically may be configured to be performed manually. Conversely, all or some pieces of processing that are described as being performed manually may be configured to be performed automatically using known method. Further, processing procedures, control procedures, names, and pieces of information including various types of data and parameters may be arbitrarily changed unless otherwise stated.

Various types of processing described in the above embodiments may be implemented by executing programs that were beforehand provided, using computer systems, such as a personal computer and a work station.

Figure 29:
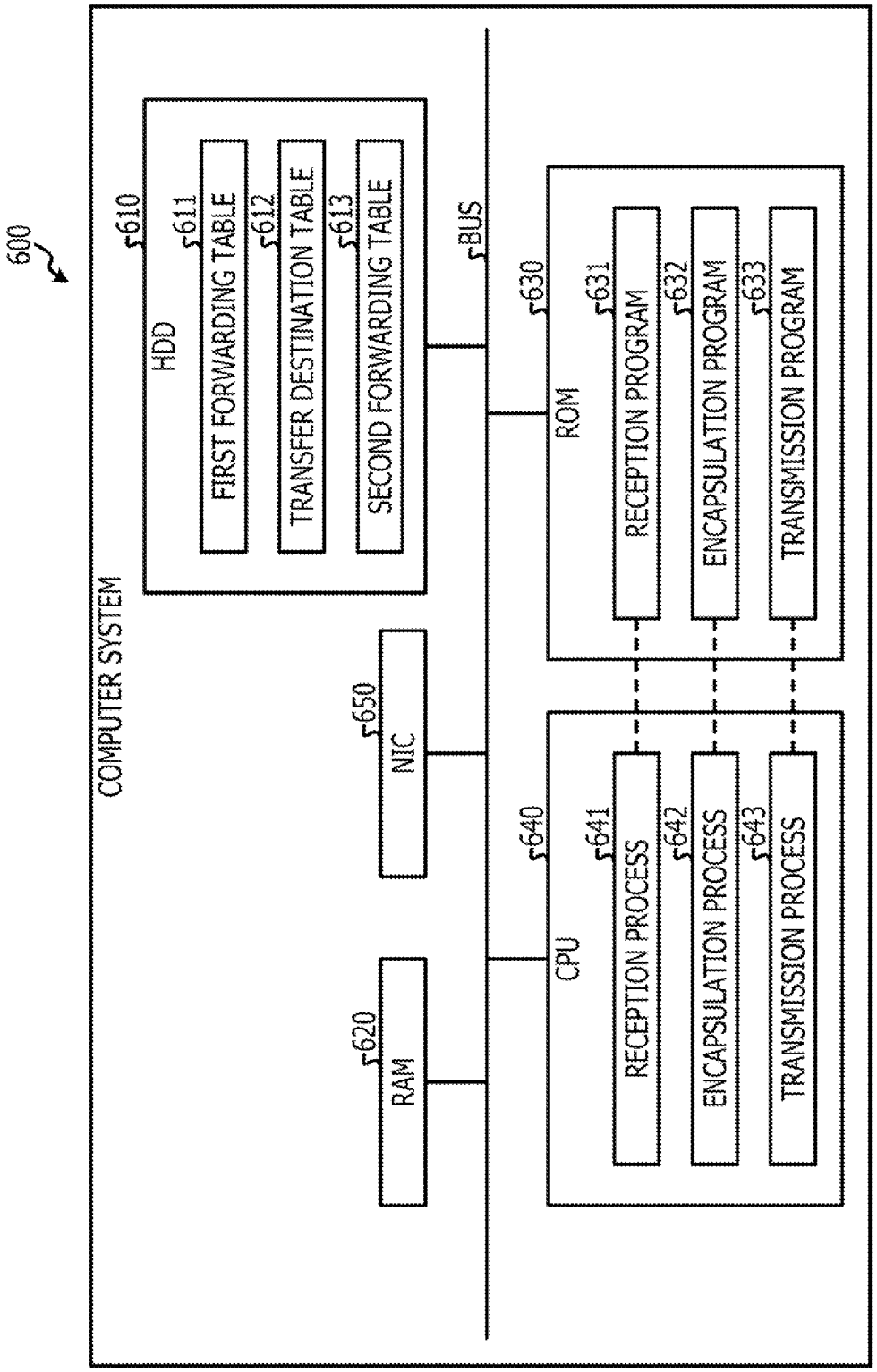
FIG. 29 is a diagram illustrating a configuration example of a computer system, according to a seventh embodiment.

FIG. 29 is a diagram illustrating en example of a computer system, according to a seventh embodiment. The computer system according to the seventh embodiment may be configured to execute programs having functions similar to the above mentioned embodiments. As depicted in FIG. 29, computer system 600 may be configured to include HDD 610, RAM 620, ROM 630, CPU 640, and NIC 650 that are coupled with each other via a bus. In ROM 630, programs that exert the functions similar to the above mentioned embodiments, for example, reception program 631, encapsulation program 632, and transmission program 633 may be beforehand stored.

CPU 640 may be configured to perform reception process 641, encapsulation process 642, and transmission process 643 by loading and executing programs 631, 632, and 633, respectively, as depicted in FIG. 29. HDD 610 may hold, for example, first forwarding table 611, transfer destination table 612, and second forwarding table 613. CPU 640 may be configured to register data, for example, in first forwarding table 611, transfer destination table 612, and second forwarding table 613. Then, CPU 640 read out data from first forwarding table 611, transfer destination table 612, and second forwarding table 613, to store the data into RAM 620 so that CPU 640 performs various types of processing based on the data stored in RAM 620.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A server for controlling a transfer destination of a packet originating from a virtual machine so as to allow a capture device arranged in a communication network to capture a packet that is transferred using a communication tunnel coupling a source virtual machine being operated by the server and a destination virtual machine being operated by another server, the server comprising:
    a memory for storing a first transfer-destination address to which a first packet originating from the source virtual machine is to be transferred when the first packet is determined to be a target packet to be captured by the capture device, in association with a virtual machine identifier identifying the source virtual machine; and
    a processor to:
        acquire the first packet originating from the source virtual machine being operated by the server,
        encapsulate the acquired first packet by adding source and destination tunnel addresses used for the communication tunnel to the acquired first packet, the source tunnel address indicating an address assigned to the server operating the source virtual machine, the destination tunnel address indicating an address assigned to the another server operating the destination virtual machine, wherein the processor further adds the first transfer-destination address to the encapsulated first packet to generate a second packet when the first packet is determined to be the target packet to be captured by the capture device, and
        transmit the second packet including the first transfer-destination address to the another server operating the destination virtual machine using the communication tunnel, while the second packet including the first packet is transferred to the first transfer-destination address.

2. The server of claim 1, wherein
the processor adds, as the first transfer-destination address, one of addresses assigned to the capture device and a mirroring router to the encapsulated first packet, to generate the second packet, the mirroring router transferring a copy of the second packet to the capture device.

3. The server of claim 1, wherein
the first packet is determined to be the target packet to be captured by the capture device when the first packet has originated from the source virtual machine that is associated with the first transfer destination address in the memory.

4. The server of claim 1, wherein
the memory stores the first transfer-destination address in association with both the virtual machine identifier identifying the source virtual machine and a pair of source and destination tunnel addresses used for the communication tunnel; and
the first packet is determined to be the target packet to be captured by the capture device when the first packet has originated from the source virtual machine that is associated with both the first transfer destination address and the pair of source and destination tunnel addresses.

5. The server of claim 1, wherein
the memory stores a second transfer-destination address together with the first transfer-destination address, in association with the virtual machine identifier identifying the source virtual machine, the second transfer-destination address being defined as an address assigned to an intermediate router via which the second packet is to be transferred;
the processor adds the second transfer destination address to the encapsulated first packet together with the first transfer destination address to generate the second packet when the first packet is determined to be the target packet to be captured by the capture device; and
the processor transmits the second packet including the first and second transfer-destination addresses to the another server using the communication tunnel while the second packet including the first packet is transferred to the first transfer-destination address via the second transfer-destination address.

6. An apparatus for controlling a transfer destination of a packet originating from a virtual machine so as to allow a capture device arranged in a communication network to capture a packet that is transferred using a communication tunnel coupling source and destination virtual machines belonging to one of one or more systems, the apparatus comprising:
    a memory for storing, for each of the one or more systems, a set of virtual machine identifiers identifying virtual machines belonging to the each of the one or more systems, in association with a system identifier identifying the each of the one or more systems; and
    a processor to:
        acquire one or more target virtual machine identifiers each identifying a virtual machine belonging to a target system by referring to the memory, the target system being selected, from the one or more systems, as a system undergoing capture processing in which a packet originating from any one of virtual machines belonging to the system is captured by the capture device,
        generate, for each of the acquired one or more target virtual machine identifiers, a transfer-destination setting message that stores a transfer-destination address in association with the each of the acquired one or more target virtual machine identifiers, the transfer-destination address being defined as an address to which the target packet to be captured by the capture device is transferred, and
        transmit, to a server operating a target virtual machine identified by the each of the acquired one or more target virtual machine identifiers, the generated transfer-destination setting message so that the server encapsulates the target packet by adding the transfer-destination address extracted from the received transfer-destination setting message, and transmits the encapsulated target packet including the transfer-destination address to another server operating the destination virtual machine using the communication tunnel while the encapsulated target packet is transferred to the transfer-destination address.

7. The apparatus of claim 6, wherein
the memory further stores an address assigned to each of a plurality of capture devices arranged in the network, in association with a capture-device identifier identifying the each of the plurality of capture devices;
the processor acquires an available capture device address assigned to an available capture device that is selected as a capture device to be currently used for capturing a packet originating from a virtual machine identified by each of the acquired one or more target virtual machine identifiers, by referring to the memory; and the processor generates, for each of the acquired one or more target virtual machine identifiers, a transfer-destination setting message that stores, as the transfer-destination address, the available capture device address in association with the each of the acquired one or more target virtual machine identifiers.

8. The apparatus of claim 7, wherein the processor acquires network-load information on a network load imposed on a router coupled to each of the plurality of capture devices;

the processor selects, as the available capture device, a capture device having the smallest network load among the plurality of capture devices, based on the acquired network-load information.

9. The apparatus of claim 7, wherein the processor acquires processing-load information on a processing load imposed on each of the plurality of capture devices; and the processor selects, as the available capture device, a capture device that has the smallest processing load among the plurality of capture devices, based on the acquired processing-load information.

10. A computer-readable, non-transitory medium storing instructions for allowing a computer system to execute a procedure for controlling a transfer destination of a packet originating from a virtual machine so as to allow a capture device arranged in a communication network to capture a packet that is transferred using a communication tunnel coupling a source virtual machine being operated by the computer system and a destination virtual machine being operated by a server, the procedure comprising:

acquiring a first packet originating from the source virtual machine being operated by the computer system, encapsulating the acquired first packet by adding source and destination tunnel addresses used for the communication tunnel, to the acquired first packet, the source tunnel address indicating an address assigned to the computer system operating the source virtual machine, the destination tunnel address indicating an address assigned to the another computer system operating the destination virtual machine, wherein a first transfer-destination address to which the first packet is to be transferred is added to the encapsulated first packet to generate a second packet when the first packet is determined to be the target packet to be captured by the capture device, and transmitting the second packet including the first transfer-destination address to the server operating the destination virtual machine using the communication tunnel, while the second packet including the first packet is transferred to the first transfer-destination address.

11. A system for controlling a transfer destination of a packet originating from a virtual machine so as to allow a capture device arranged in a communication network to capture a packet that is transferred using a communication tunnel coupling source and destination virtual machines, the system comprising:

a plurality of servers to each operate one or more virtual machines; and a management device to manage the plurality of servers, wherein the management device:

acquires one or more target virtual machine identifiers each identifying a target virtual machine that undergoes capture processing in which any packet originating from the target virtual machine is captured by the capture device, generates, for each of the acquired one or more target virtual machine identifiers, a transfer-destination setting message that stores a transfer-destination address in association with the each of the acquired one or more target virtual machine identifiers, the transfer-destination address indicating an address to which a target packet to be captured by the capture device is transferred, and transmits the generated transfer-destination setting message to a first server operating the target virtual machine identified by the each of the acquired one or more target virtual machine identifiers; and the first server:

receives the transfer-destination setting message from the management device, acquires a first packet originating from the target virtual machine being operated by the first server, encapsulates the acquired first packet by adding source and destination tunnel addresses used for the communication tunnel to the acquired first packet, the source tunnel address indicating an address assigned to the first server, the destination tunnel address indicating an address assigned to a second server operating the destination virtual machine, wherein the first server further adds the transfer-destination address included in the received transfer-destination setting message to the encapsulated first packet to generate a second packet when the first packet is determined to be the target packet to be captured by the capture device, and transmits the second packet including the first transfer-destination address to the second server using the communication tunnel, while the second packet including the first packet is transferred to the transfer-destination address.

\* \* \* \* \*